US011829938B2

(12) United States Patent
Kanaoka et al.

(10) Patent No.: US 11,829,938 B2
(45) Date of Patent: Nov. 28, 2023

(54) INFORMATION PROCESSING SYSTEM, INFORMATION PROCESSING METHOD, AND PROGRAM-STORED NON-TRANSITORY STORAGE MEDIUM

(71) Applicant: TOYOTA JIDOSHA KABUSHIKI KAISHA, Toyota (JP)

(72) Inventors: Kei Kanaoka, Nagoya (JP); Shun Maeda, Nisshin (JP); Yoshihiro Murozaki, Nisshin (JP); Hiroko Tsujimura, Nagoya (JP); Daiki Kaneichi, Nisshin (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 758 days.

(21) Appl. No.: 16/233,166

(22) Filed: Dec. 27, 2018

(65) Prior Publication Data

US 2019/0220818 A1    Jul. 18, 2019

(30) Foreign Application Priority Data

Jan. 12, 2018    (JP) .................................. 2018-003506

(51) Int. Cl.
  *G06Q 10/0835*    (2023.01)
  *G06Q 10/0832*    (2023.01)
  (Continued)

(52) U.S. Cl.
  CPC ... *G06Q 10/08355* (2013.01); *G06Q 10/0832* (2013.01); *G07C 9/00896* (2013.01); *H04L 9/085* (2013.01)

(58) Field of Classification Search
  USPC ....................................................... 705/330
  See application file for complete search history.

(56) References Cited

U.S. PATENT DOCUMENTS 10,482,421 B1 *  11/2019  Ducrou ............... G06K 9/00671
2015/0294266 A1 * 10/2015  Siragusa ............. G06Q 10/0833
                                                    705/333

(Continued)

FOREIGN PATENT DOCUMENTS

JP        2006-206225         8/2006
JP        2017-16585 A        1/2017
WO    WO-2016054200 A1 *     4/2016    ............. G06F 21/60

OTHER PUBLICATIONS

A method of dynamic delivery routing when the consumer is in a specified home location. Sep. 9, 2015. The IP.com Journal. pp. 1-2. https://priorart.ip.com/IPCOM/000243026. (Year: 2015).*

*Primary Examiner* — Jeff Zimmerman
*Assistant Examiner* — Hunter A Molnar
(74) *Attorney, Agent, or Firm* — Oblon, McClelland, Maier & Neustadt, L.L.P.

(57) ABSTRACT

An information processing system includes: an acquisition portion configured to acquire pieces of attribute information of a first package; a controlling portion configured to perform a determination process of determining whether or not a first vehicle is suitable as a collection and delivery place for the first package based on package attribute condition information that is included in the attribute information of the first package, the package attribute condition information being related to an attribute of the first package as one of determination conditions based on which the first vehicle is determined to be suitable as the collection and delivery place; and an output portion configured to output a result of the determination process.

14 Claims, 22 Drawing Sheets

(51) Int. Cl.
*G07C 9/00* (2020.01)
*H04L 9/08* (2006.01)

(56) References Cited

U.S. PATENT DOCUMENTS

| | | | |
|---|---|---|---|
| 2016/0148154 A1* | 5/2016 | Tibbs | G06Q 10/0833 |
| | | | 705/338 |
| 2016/0189098 A1* | 6/2016 | Beaurepaire | H04W 12/084 |
| | | | 705/337 |
| 2017/0017920 A1* | 1/2017 | Stark | G06K 19/06037 |
| 2017/0169422 A1* | 6/2017 | Ye | H04L 9/3234 |
| 2018/0012176 A1* | 1/2018 | McHale | G06Q 10/0832 |
| 2018/0121875 A1* | 5/2018 | Satyanarayana Rao | |
| | | | G06Q 10/08355 |
| 2018/0164818 A1* | 6/2018 | Wilkinson | G01S 5/0027 |
| 2018/0174262 A1* | 6/2018 | Wilkinson | G06Q 10/087 |
| 2020/0117217 A1* | 4/2020 | Yuzawa | G05D 1/0212 |
| 2020/0327466 A1* | 10/2020 | Noda | G06Q 10/0833 |

\* cited by examiner

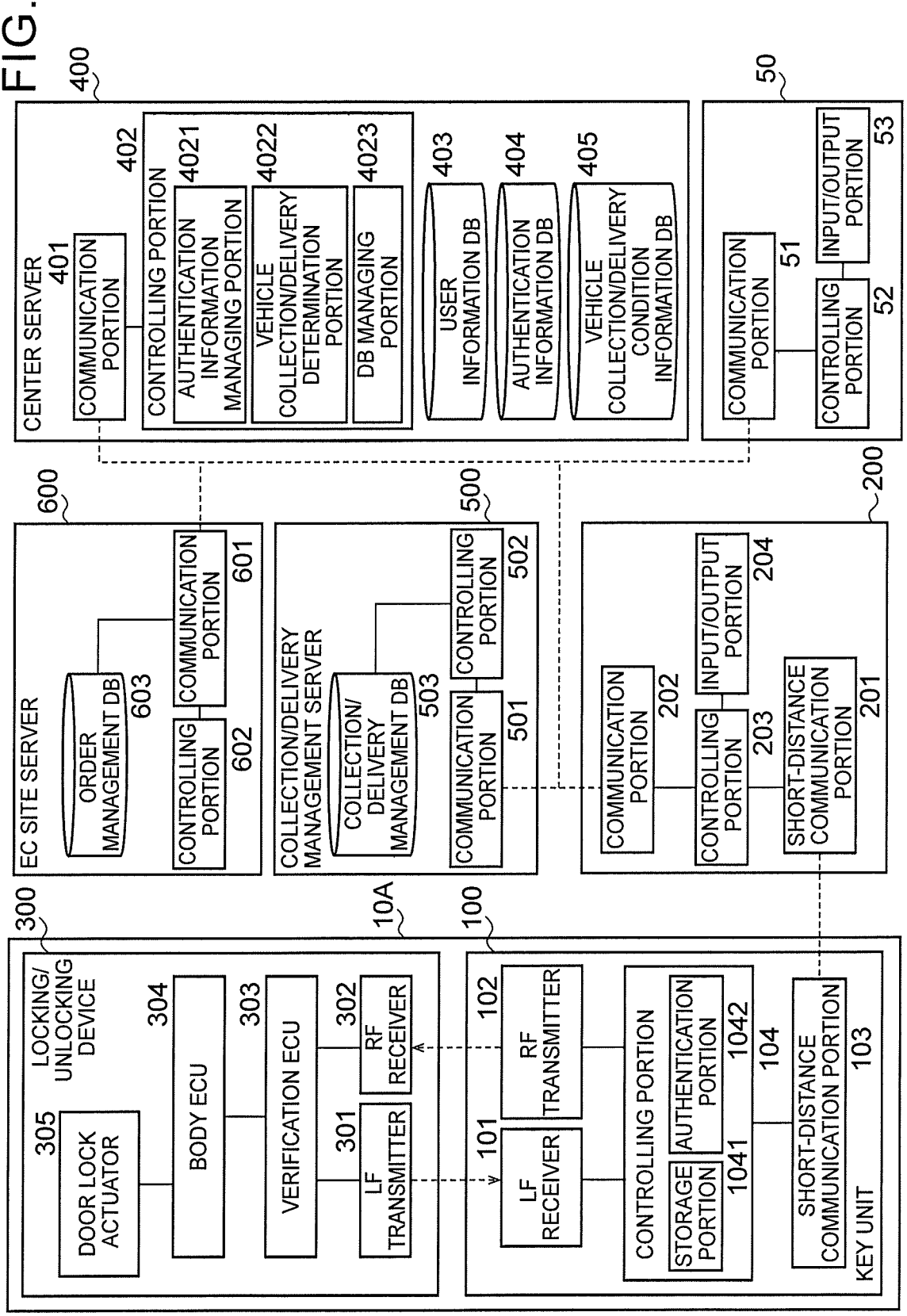

FIG. 3

| CLIENT USER ID | ORDER ID | DESIGNATED COLLECTION/ DELIVERY DATE AND TIME | COLLECTION/ DELIVERY PLACE | PACKAGE SIZE | PACKAGE WEIGHT |
|---|---|---|---|---|---|
| S001 | B001 | - | VEHICLE | 120 | ... |
| S001 | B002 | - | VEHICLE | 80 | ... |
| S001 | B003 | - | VEHICLE | 60 OR LESS | ... |

| COLD PRODUCT | FROZEN PRODUCT | ID CONFIRMATION NECESSITY | FREIGHT COLLECT | CASH ON DELIVERY | RIGHT SIDE UP WITH CARE | FRAGILE PRODUCT | EXPENSIVE PRODUCT |
|---|---|---|---|---|---|---|---|
| - | - | NOT REQUIRED | ○ | ○ | - | ○ | - |
| ○ | - | NOT REQUIRED | - | ○ | ○ | - | - |
| - | - | REQUIRED | - | - | - | - | - |

FIG. 4

| CLIENT USER ID | VEHICLE ID | VEHICLE POSITION | INSIDE/ OUTSIDE | ROOF |
|---|---|---|---|---|
| S001 | H001 | HOME | INSIDE | PROVIDED |
| S001 | H002 | PARKING LOT | OUTSIDE | NOT PROVIDED |
| S002 | H101 | HOME | OUTSIDE | NOT PROVIDED |
| S003 | H201 | PARKING LOT | INSIDE | PROVIDED |

FIG. 5

| CLIENT USER ID | COLLECTION/ DELIVERY PLACE | MONDAY | | | | | TUESDAY | | | | | WEDNESDAY | | | | |
|---|---|---|---|---|---|---|---|---|---|---|---|---|---|---|---|---|
| | | 1 | 2 | 3 | 4 | 5 | 1 | 2 | 3 | 4 | 5 | 1 | 2 | 3 | 4 | 5 |
| S001 | VEHICLE #1 | × | × | × | × | ○ | × | × | × | × | ○ | × | × | × | × | ○ |
| S001 | VEHICLE #2 | ○ | ○ | ○ | ○ | ○ | ○ | ○ | ○ | ○ | ○ | ○ | ○ | ○ | ○ | ○ |

| THURSDAY | | | | | FRIDAY | | | | | SATURDAY | | | | | SUNDAY | | | | |
|---|---|---|---|---|---|---|---|---|---|---|---|---|---|---|---|---|---|---|---|
| 1 | 2 | 3 | 4 | 5 | 1 | 2 | 3 | 4 | 5 | 1 | 2 | 3 | 4 | 5 | 1 | 2 | 3 | 4 | 5 |
| × | × | × | × | ○ | × | × | × | × | ○ | ○ | ○ | ○ | ○ | ○ | ○ | ○ | ○ | ○ | ○ |
| ○ | ○ | ○ | ○ | ○ | ○ | ○ | ○ | ○ | ○ | ○ | × | × | × | × | ○ | ○ | ○ | ○ | ○ |

FIG. 6

| PACKAGE DELIVERABLE TO VEHICLE | RIGHT SIDE UP WITH CARE | | | |
|---|---|---|---|---|
| PACKAGE UNDELIVERABLE TO VEHICLE | FROZEN PRODUCT | ID CONFIRMATION REQUIRED | FREIGHT COLLECT | CASH ON DELIVERY |
| DETERMINATION REQUIRED | COLD PRODUCT | FRAGILE PRODUCT | EXPENSIVE PRODUCT | |

FIG. 7

| VEHICLE POSITION | SUMMER (REQUIRED TO BE REFRIGERATED) | | | | | WINTER (REQUIRED TO BE REFRIGERATED) | | | | |
|---|---|---|---|---|---|---|---|---|---|---|
| | 1 | 2 | 3 | 4 | 5 | 1 | 2 | 3 | 4 | 5 |
| INSIDE | × | × | × | × | × | ○ | × | × | ○ | ○ |
| OUTSIDE (WITH ROOF) | × | × | × | × | × | ○ | × | × | ○ | ○ |
| OUTSIDE (WITHOUT ROOF) | × | × | × | × | × | ○ | × | × | × | ○ |

FIG. 18

| PACKAGE DELIVERABLE TO VEHICLE | RIGHT SIDE UP WITH CARE | | | | | |
|---|---|---|---|---|---|---|
| PACKAGE UNDELIVERABLE TO VEHICLE | FROZEN PRODUCT | | | | | |
| DETERMINATION REQUIRED | COLD PRODUCT | FRAGILE PRODUCT | EXPENSIVE PRODUCT | ID CONFIRMATION REQUIRED | FREIGHT COLLECT | CASH ON DELIVERY |

INFORMATION PROCESSING SYSTEM, INFORMATION PROCESSING METHOD, AND PROGRAM-STORED NON-TRANSITORY STORAGE MEDIUM

INCORPORATION BY REFERENCE

The disclosure of Japanese Patent Application No. 2018-003506 filed on Jan. 12, 2018 including the specification, drawings and abstract is incorporated herein by reference in its entirety.

BACKGROUND

1. Technical Field

The disclosure relates to an information processing system, an information processing method, and a program-stored non-transitory storage medium.

2. Description of Related Art

As means for efficiently performing delivery of a parcel (package) between a user of a collection and delivery service and a parcels delivery company that performs collection and delivery, a trunk share system in which a vehicle such as a passenger car designated by the user is used as a collection and delivery place of the parcel has been developed in recent years. For example, Japanese Unexamined Patent Application Publication No. 2006-206225 (JP 2006-206225 A) proposes a system configured such that, at the time of collection and delivery of a parcel, an authentication process is performed between a collection and delivery communications device for the parcels delivery company and a vehicle communications device provided in the designated vehicle, and when the authentication is successfully performed, the designated vehicle can be locked or unlocked.

SUMMARY

Here, in the system where collection and delivery of a package is performed by use of a vehicle like the above trunk share system, a surrounding environment around the vehicle largely changes and has a large influence, for example, and therefore, there might be a case where the vehicle is not suitable as a delivery destination depending on the attribute of the package. For example, in a case where the package is a frozen product, if the frozen product is delivered to the vehicle and left for a while, the frozen product is defrosted, and the quality thereof might decrease. In view of this, it is not appropriate to use the vehicle as a delivery destination for the frozen product.

The disclosure provides a technique that can contribute to improvement of the efficiency of a collection and delivery operation in a system in which a vehicle can be designated as one of collection and delivery places for a package.

A first aspect of the present disclosure relates to an information processing system. The information processing system includes an acquisition portion, a controlling portion, and an output portion. The acquisition portion is configured to acquire attribute information of a first package. The controlling portion is configured to perform a determination process of determining whether or not a first vehicle is suitable as a collection and delivery place for the first package based on package attribute condition information that is included in the attribute information of the first package. The package attribute condition information is related to an attribute of the first package as one of determination conditions based on which the vehicle is determined to be suitable as the collection and delivery place. The output portion is configured to output a result of the determination process.

The vehicle is an automobile such as a passenger car, a commercial vehicle, or a van, for example. The collection and delivery place may be a delivery destination of the package or a place where a target package for collection and delivery is delivered. The attribute information of the package is, for example, information indicative of whether the package is a cold product or a frozen product, information indicating that ID confirmation is required, information indicative of freight collect, information indicative of a fragile product, information indicative of an expensive product, and the like. There might be a case where the vehicle is not suitable as the collection and delivery place depending on an attribute of the package. In the first aspect, the controlling portion determines whether or not the vehicle is suitable as the collection and delivery place for the package, based on the package attribute condition information, thereby making it possible to improve the efficiency of a collection and delivery operation of the package, including a designation operation of the collection and delivery place.

In the first aspect, the controlling portion may be configured to perform the determination process based on the package attribute condition information and surrounding environment condition information indicative of a surrounding environment around a vehicle as one of the determination conditions.

Information on the surrounding environment around the vehicle is a season, inside or outside, with roof or without roof, a temperature, and the like, for example. The vehicle is movable and is placed outside or inside. Accordingly, in comparison with options as other collection and delivery places such as a home, a convenience store, and a locker, the surrounding environment around the vehicle largely changes and has a large influence. With the above configuration, in consideration of the information on the surrounding environment around the vehicle in addition to the attribute information of the package, it is possible to flexibly determine whether or not the vehicle is suitable as the collection and delivery place for the package, so that the influence of the surrounding environment on the package becomes small.

In the first aspect, the controlling portion may be configured to perform the determination process further based on package deliverable schedule information in the first vehicle for a user who has a right to designate the first vehicle as the collection and delivery place.

With the above configuration, in consideration of the package deliverable schedule information in the first vehicle for the user, it is possible to determine whether or not the first vehicle is suitable as the collection and delivery place for the package, so that the package can be more surely collected from and delivered to the first vehicle.

In the first aspect, the package attribute condition information may include information indicating that direct delivery to a recipient is required, as attribute information of the first package for which the first vehicle is not suitable as the collection and delivery place. When the attribute information of the first package includes the information indicating that direct delivery to the recipient is required, the controlling portion may be configured to determine that the first vehicle is not suitable as the collection and delivery place for the first package.

For example, in a case where the vehicle is selected as the collection and delivery place, a recipient of the package is more likely to be absent, and therefore, the vehicle is not suitable as the collection and delivery place for the package having, as an attribute, information indicating that direct delivery to the recipient is required. With the above configuration, it is possible to restrain redelivery of the package caused by delivering, to the vehicle, the package having, as an attribute, information indicating that direct delivery to the recipient is required.

In the first aspect, when the attribute information of the first package includes information indicating that direct delivery to a recipient is required, the controlling portion may be configured to perform the determination process on the first vehicle designated as the collection and delivery place for the first package, based on a confirmation result about whether or not the recipient is present in the first vehicle on collection and delivery scheduled date and time.

With the above configuration, the first vehicle can be designated as the collection and delivery place with the proviso that the recipient is present in the first vehicle on the collection and delivery scheduled date and time, so that the recipient can receive the first package in the first vehicle at a place of visit as the collection and delivery place, for example.

In the first aspect, the information processing system may further include a receiving portion, a determination portion, and a transmission portion. The receiving portion may be configured to receive positional information of the first vehicle and positional information of a carrier for the first package. The determination portion may be configured to, when it is determined that the first vehicle is suitable as the collection and delivery place for the first package, determine whether or not a distance between the first vehicle and the carrier is less than a first distance, based on the positional information of the first vehicle and the positional information of the carrier. The transmission portion may be configured to, when it is determined that the distance between the first vehicle and the carrier is less than the first distance, transmit, to at least a user terminal of the carrier, a notification indicating that the first vehicle and the carrier come close to each other. Note that the notification indicating that the first vehicle and the carrier come close to each other may be also transmitted to a user terminal of the recipient present in the first vehicle.

The above configuration can support the recipient to meet the carrier, so that the recipient can more surely receive, in the first vehicle, the package having, as one of the pieces of attribute information, information indicating that direct delivery to the recipient is required.

In the first aspect, the package attribute condition information may include information indicative of a frozen product as the attribute information of the package for which the vehicle is not suitable as the collection and delivery place. When the attribute information of the first package includes the information indicative of the frozen product, the controlling portion may be configured to determine that the first vehicle is not suitable as the collection delivery place for the first package.

When a frozen product is left in the vehicle, the frozen product is defrosted and is more likely to decrease in quality, so the vehicle is not suitable as the collection and delivery place for the package that is a frozen product. With the above configuration, in the case where the package is a frozen product, it is possible to restrain such a situation that the package is delivered to the vehicle and left for a predetermined time and the quality of the frozen product is decreased.

In the first aspect, the package attribute condition information may include information indicative of a cold product, as attribute information for which the surrounding environment condition information is used in the determination process. The surrounding environment condition information may include date and time condition information indicative of date and time when the vehicle is suitable or not suitable as the collection and delivery place. When the attribute information of the first package includes the information indicative of the cold product, the controlling portion may be configured to perform the determination process based on the date and time condition information regarding information on date and time for delivery to the first vehicle.

Depending on a season and a time zone, it is also conceivable that a difference between the temperature around the vehicle and the temperature of a cold product as the first package is small, and in such a case, even if the cold product as the first package is placed in the vehicle, the decrease in quality is less likely to be caused. With the above configuration, in a case where the first package is a cold product, it is determined whether or not the vehicle is suitable as the collection and delivery place for the package, based on delivery date and time, thereby making it possible to improve a utilization ratio of the vehicle as the collection and delivery place.

In the first aspect, the package attribute condition information may include information indicative of a cold product, as attribute information for which the surrounding environment condition information is used in the determination process. The surrounding environment condition information may include sunshine condition information indicative of a degree of sunlight under which the vehicle is suitable or not suitable as the collection and delivery place. When the attribute information of the first package includes the information indicative of the cold product, the controlling portion may perform the determination process based on the sunshine condition information regarding information indicative of the degree of sunlight on the first vehicle designated as the collection and delivery place for the first package.

The temperature inside the vehicle changes, for example, in accordance with the degree of sunlight on the vehicle, e.g., whether the vehicle is placed inside or outside or whether the vehicle is placed under a roof or not, even at the same time of day, and therefore, the temperature difference between the vehicle and the package as a cold product also changes. In the above configuration, in a case where the package is a cold product, it is determined whether or not the first vehicle is suitable as the collection and delivery place, in consideration of the degree of sunlight on the vehicle. Hereby, while the quality decrease of the cold product is restrained, it is possible to improve the utilization ratio of the vehicle as the collection and delivery place.

In the first aspect, the surrounding environment condition information may include area condition information indicative of an area where the vehicle is suitable or not suitable as the collection and delivery place. The controlling portion may be configured to perform the determination process further by use of the area condition information, further based on an address of a location of the first vehicle designated as the collection and delivery place for the first package.

With the above configuration, it is determined whether or not the first vehicle is suitable as the collection and delivery place for the first package, based on whether or not the address of the location of the first vehicle is within an area where car break-in and the like occur frequently, for example, thereby making it possible to secure the security of the first package.

In the first aspect, the surrounding environment condition information may include parking position condition information indicative of a parking position at which the vehicle is suitable or not suitable as the collection and delivery place. The controlling portion may be configured to perform the determination process further by use of the parking position condition information, further based on information indicative of a parking position of the first vehicle designated as the collection and delivery place for the first package.

The package placed in the vehicle is often exposed to the eyes of a third party except the recipient in comparison with other collection and delivery places such as a home and a locker. However, in a case where the vehicle is located in a garage at home or the like, the package is rarely exposed to the eyes of a third party, so the security is more likely to be secured. In the above configuration, it is determined whether or not the first vehicle is suitable as the collection and delivery place for the package, based on whether the position of the first vehicle is a home of the recipient of the first package or not. As a result, it is possible to increase opportunities that the first vehicle is used as the collection and delivery place for the package, thereby making it possible to increase the efficiency of the delivery operation.

In the first aspect, the information processing system may further include an issue portion configured to, when it is determined that the first vehicle designated as the collection and delivery place for the first package is suitable as the collection and delivery place, issue authentication information by which the first vehicle is configured to be locked or unlocked. The issue portion may be configured to control access of a carrier to a predetermined compartment in the first vehicle by issuing predetermined authentication information to a user terminal of the carrier. The predetermined compartment may be a compartment in which the first package is placed. The predetermined compartment may be configured to be locked or unlocked through a locking-unlocking process performed by a locking-unlocking control device to perform the locking-unlocking process. The predetermined authentication information may cause the locking-unlocking control device to perform the locking-unlocking process.

With the above configuration, in a case where it is determined that the first vehicle is suitable as the collection and delivery place, a person who does not have an access right to the vehicle, e.g., a delivery user of a parcels delivery company, acquires the authentication information of the first vehicle, so that the person can deliver the package to the first vehicle.

In the first aspect, the information processing system may further include a receiving portion configured to receive a determination request to determine whether or not the vehicle is suitable as the collection and delivery place for the first package.

Note that, in the first aspect, the information processing system may be constituted by one or more processing devices such as computers. In a case where the information processing system is constituted by the processing devices, respective constituents of the information processing system are provided dispersedly in the processing devices, and the processing devices cooperate with each other to implement processes as the information processing system.

A second aspect of the present disclosure relates to an information processing method. The information processing method includes a step of acquiring attribute information of a first package; a step of performing a determination process of determining whether or not a vehicle is suitable as a collection and delivery place for the first package based on package attribute condition information that is included in the attribute information of the first package. The package attribute condition information is related to an attribute of the first package as one of determination conditions based on which the first vehicle is determined to be suitable as the collection and delivery place; and a step of outputting a result of the determination process.

In the second aspect, the information processing method may further include a step of receiving a determination request to determine whether or not the first vehicle is suitable as the collection and delivery place for the first package.

A third aspect of the disclosure relates to a non-transitory storage medium in which a program is stored. In the non-transitory storage medium, when the program is executed by a computer, the computer executes the information processing method according to the second aspect.

With the first aspect, the second aspect, and the third of the disclosure, it is possible to improve the efficiency of the collection and delivery operation of the package with the vehicle being used as the collection and delivery place.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a block diagram schematically exemplifying configurations of an in-vehicle device, a user terminal, a center server, a collection and delivery management server, and an EC site server that constitute the trunk share system illustrated in FIG. 1;

FIG. 3 is an example of an order information table;

FIG. 4 is an example of a vehicle location information table;

FIG. 5 is an example of a user receivable time zone information table;

FIG. 6 is an example of a package attribute condition table;

FIG. 7 is an example of an environmental condition table;

FIG. 18 is an example of a package attribute condition table according to the second embodiment;

DETAILED DESCRIPTION OF EMBODIMENTS

The following describes a specific embodiment of the disclosure with reference to the drawings. The configurations described in the following embodiments are not intended to limit the technical scope of the disclosure only to them, unless otherwise designated.

First Embodiment

System Configuration

Figure 1:
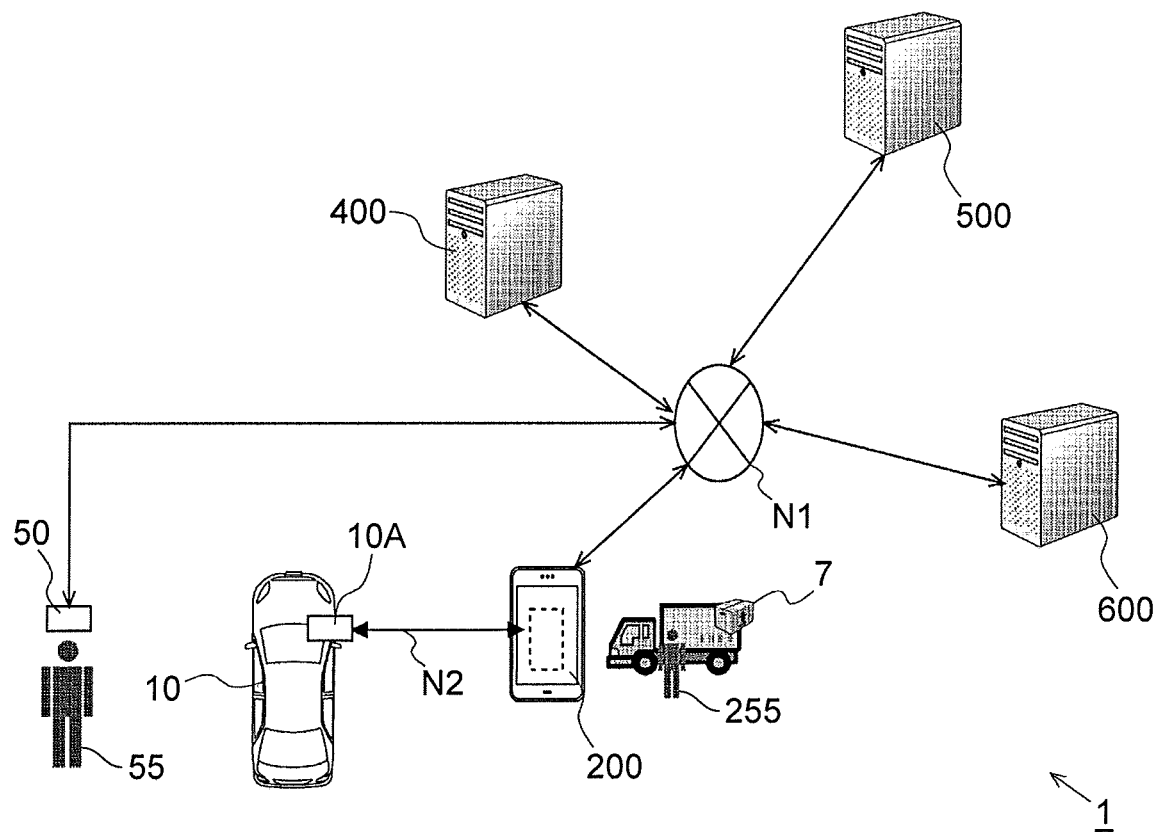
FIG. 1 is a view illustrating a schematic configuration of a trunk share system according to a first embodiment.

FIG. 1 is a view illustrating a schematic configuration of a trunk share system 1 according to the first embodiment. The trunk share system 1 is a system for implementing a collection/delivery service in which a trunk or a vehicle cabin of a vehicle 10 designated by a client is shared between the client who requests a collection/delivery operation of a parcel (package) and a person who performs the requested collection/delivery operation of the parcel, so that the trunk or the vehicle cabin is used as a collection/delivery place. Accordingly, the "client who requests the collection/delivery operation of the parcel" and the "person who performs the collection/delivery operation of the parcel" are both users who use the trunk or the vehicle cabin of the vehicle, but in order to distinguish them, the former is referred to as a "client user" and the latter is referred to as a "collection/delivery user."

Further, the trunk or the vehicle cabin is a predetermined region, in the vehicle 10, configured such that a package to be collected or delivered can be placed therein and locking/unlocking is performed by an in-vehicle device 10A as will be described later. More specifically, the vehicle cabin is a space where a seat for an occupant in the vehicle 10 is provided, for example. The trunk is a space such as a trunk room where a package is loaded, for example. The trunk is a region separated from the vehicle cabin where a driver and so on of the vehicle 10 get in, so that the trunk and the vehicle cabin cannot access each other. Alternatively, the trunk may be a region that can mutually access the vehicle cabin where a driver and so on are get in, depending on a type or the like of the vehicle 10.

In an example of FIG. 1, the trunk share system 1 includes a collection/delivery package 7, a vehicle 10, a user terminal 200 for a collection/delivery user, a collection/delivery user 255, a user terminal 50 for a client user, a client user 55, a center server 400, a collection/delivery management server 500, and an electronic commerce (EC) site server 600. The vehicle 10 is provided with an in-vehicle device 10A. The user terminal 200, the user terminal 50, the center server 400, the collection/delivery management server 500, and the EC site server 600 are connected mutually via a network N1. Note that the network N1 is a global public communication network such as the Internet, for example, and a wide area network (WAN) or other communication networks may be employed. Further, the network N1 may include a telecommunications network such as a mobile phone and a wireless communication network such as WiFi. The in-vehicle device 10A is connected to the user terminal 200 of the collection/delivery user via a network N2 including short-distance wireless communication and the like.

The vehicle 10 is a passenger car, for example. Further, the vehicle 10 may be a goods vehicle such as a lightweight truck or a van. The vehicle 10 is used as one of collection/delivery places for a package in the trunk share system 1. The client user is a person having an authority to select the vehicle 10 as the collection/delivery place for the package. Examples of the client user include a holder of the vehicle 10 and a family of the holder of the vehicle 10.

The center server 400 performs, for example, a determination process on whether or not the vehicle 10 is suitable as the collection/delivery place for the package, based on attribute information of the package. Hereinafter, the determination process on whether or not the vehicle 10 is suitable as the collection/delivery place for the package is referred to as a vehicle collection/delivery determination process. The attribute information of the package is attribute information of the package such as size of the package, cold product, frozen product, ID confirmation necessity, freight collect, cash on delivery, right side up with care, expensive product, fragile product, and the like, for example. Note that the attribute information of the package is not limited to them.

The EC site server 600 is, for example, a server managed by an electronic commerce company establishing a merchandise purchase site, an operator of a site for consumer to consumer (C to C) between end users, and the like. In the first embodiment, the EC site server 600 is assumed as a server of an electronic commerce company establishing a merchandise purchase site.

The EC site server 600 receives an order of a product from the user terminal 50 of the client user and requests delivery of the product to the collection/delivery management server 500. In a case where a delivery destination of the product, designated by the client user, is the vehicle 10, the EC site server 600 transmits a request of a vehicle collection/delivery determination to the center server 400.

The collection/delivery management server 500 is, for example, a server managed by a parcels delivery company. The collection/delivery management server 500 receives a collection/delivery request from the EC site server 600 or the user terminal 50 of the client user. The collection/delivery indicates collection or/and delivery of a package. In a case where the vehicle 10 is designated as a collection/delivery place in the collection/delivery request received from the client user via the user terminal 50, the collection/delivery management server 500 transmits a request of the vehicle collection/delivery determination to the center server 400.

When it is determined that the vehicle 10 is not suitable as the collection/delivery place by the vehicle collection/delivery determination by the center server 400, the EC site server 600 and the collection/delivery management server 500 request the client user to change the collection/delivery place via the user terminal 50, for example.

The collection/delivery management server 500 determines a collection/delivery schedule and notifies the collection/delivery schedule to the user terminal 200 of the collection/delivery user in charge of collection/delivery. The user terminal 200 of the collection/delivery user collects/delivers the package in a predetermined time zone in accordance with the collection/delivery schedule. For example, in a case where the collection/delivery place is the vehicle 10, when the user terminal 200 detects that the user terminal 200 has entered a range within a predetermined distance from the vehicle 10, the user terminal 200 transmits, to the collection/delivery management server 500, an issue request of authentication information for locking/unlocking the vehicle cabin or the trunk of the vehicle 10, and the collection/delivery management server 500 requests the center server 400 to issue the authentication information. The user terminal 200 may detect that the user terminal 200 has entered the range within the predetermined distance from the vehicle 10, based on positional information between the vehicle 10 and the user terminal 200 of the collection/delivery user or based on the fact that the user terminal 200 of the collection/delivery user is connected to the vehicle 10 via the network N2 by short-distance wireless communication.

Further, the center server 400 holds authentication information to lock/unlock the vehicle 10. The center server 400 receives a request to issue the authentication information from the user terminal 200 of the collection/delivery user via the collection/delivery management server 500 and performs an authentication information issue control process, for example. The center server 400 transmits the authentication information of the vehicle 10 to the user terminal 200 of the collection/delivery user via the collection/delivery management server 500. The collection/delivery user then locks/unlocks the vehicle cabin or the trunk of the vehicle 10 by use of the authentication information acquired by the user terminal 200, so that the collection/delivery user can access the vehicle cabin or the trunk of the vehicle 10 to deliver or collect the package.

Here, the authentication information is digital information transferred to the in-vehicle device 10A from the user terminal 200 via short-distance wireless communication and subjected to an authentication process by the in-vehicle device 10A, so that the in-vehicle device 10A performs a locking/unlocking process of the vehicle cabin or the trunk of the vehicle 10. Further, the locking/unlocking process of the vehicle cabin or the trunk of the vehicle 10 is a process to cause the in-vehicle device 10A (described later in detail) to lock/unlock the door of the vehicle cabin or the trunk of the vehicle 10 in which the package is to be accommodated.

An application of the merchandise purchase site, an application for a collection/delivery request, and an application to use a service provided by the trunk share system 1 are installed in the user terminal 50 of the client user, for example. The client user uses those applications to order a product to the EC site server 600 and request collection/delivery of the package to the collection/delivery management server 500 through the user terminal 50.

Since the application to use the service provided by the trunk share system 1 is installed in the user terminal 50, the client user can designate the vehicle 10 as a collection/delivery place at the time when the client user orders a product or requests collection/delivery of a package by use of the application of the merchandise purchase site and the application for the collection/delivery request, for example. The client user can also designate a home, an office, a convenience store, a locker, and the like as the collection/delivery place in addition to the vehicle 10, for example.

Note that the operator that manages the center server 400 may be an operator different from an operator that manages the collection/delivery management server 500 or an operator that manages the EC site server 600 or may be the same operator as them. In the first embodiment, the operator that manages the center server 400 is an operator different from the operator that manages the collection/delivery management server 500 or the operator that manages the EC site server 600. Note that one collection/delivery management server 500 and one EC site server 600 are included in the trunk share system 1 illustratively, but two or more collection/delivery management servers 500 and EC site servers 600 may be included therein.

FIG. 2 is a block diagram schematically exemplifying configurations of the in-vehicle device 10A, the user terminal 200 of the collection/delivery user, the user terminal 50 of the client user, the center server 400, the collection/delivery management server 500, and the EC site server 600 that constitute the trunk share system 1. With reference to FIG. 2, hardware configurations and functional configurations of the in-vehicle device 10A, the user terminal 200 of the collection/delivery user, the user terminal 50 of the client user, the collection/delivery management server 500, the EC site server 600, and the center server 400 will be described.

The in-vehicle device 10A includes a key unit 100 and a locking/unlocking device 300. The key unit 100 has a wireless interface similarly to an electronic key (hereinafter referred to as a portable) of a smart key. By communicating with the existing locking/unlocking device 300 provided in the in-vehicle device 10A, locking and unlocking of the trunk or the vehicle cabin of the vehicle 10 can be performed without using a physical key. Further, the key unit 100 performs short-distance wireless communication with the user terminal 200 of the collection/delivery user and determines whether the key unit 100 functions as an electronic key for the vehicle 10 or not, based on a result of the authentication process performed on the user terminal 200 of the collection/delivery user. Hereinafter, locking/unlocking of the trunk or the vehicle cabin of the vehicle 10 will be just referred to as "locking/unlocking of the vehicle 10" when it is not necessary to distinguish the trunk from the vehicle cabin.

When the user terminal 200 of the collection/delivery user accesses the vehicle cabin or the trunk of the vehicle 10 to deliver or/and collect a collection/delivery package, the user terminal 200 requests the center server 400 to issue authentication information to lock and unlock the vehicle cabin or the trunk via the collection/delivery management server 500 as described above. The authentication information transmitted from the user terminal 200 of the collection/delivery user to the key unit 100 is verified with authentication information stored in advance in the key unit 100. When the authentication process by the key unit 100 is successful, the user terminal 200 is authenticated as a terminal that can operate the in-vehicle device 10A rightfully.

When the user terminal 200 is authenticated, the key unit 100 transmits a key ID of the vehicle 10, stored in advance in the key unit 100 and associated with the authentication information, to the locking/unlocking device 300 together with a locking/unlocking signal. When the key ID received from the key unit 100 agrees with a key ID stored in advance in the locking/unlocking device 300, the locking/unlocking device 300 locks or unlocks the vehicle 10. The key unit 100 and the locking/unlocking device 300 work by electric power supplied from a battery provided in the vehicle 10. Note that the key ID stored in advance in the key unit 100 may be encrypted by the authentication information. In this case, when the authentication process on the user terminal 200 of the collection/delivery user is successful, the key unit 100 may decrypt the key ID by the authentication information and transmit it to the locking/unlocking device 300. Further, the authentication information and the key ID may vary in accordance with respective loading regions in the vehicle cabin and the trunk. For example, the authentication information and the key ID may be different between a door for a driver seat, a door for a front passenger seat, a door for a rear seat, and a door for the trunk room.

Here, the locking/unlocking device 300 will be described in detail. The locking/unlocking device 300 is a device for locking and unlocking doors of the vehicle cabin and the trunk of the vehicle 10. For example, the door of the vehicle 10 is locked and unlocked in response to a locking signal and an unlocking signal transmitted from a portable for the vehicle 10 via a radio wave of a radio frequency (hereinafter referred to as RF) band. Further, the locking/unlocking device 300 also has a function to transmit a radio wave of a low frequency (hereinafter referred to as LF) band for searching the portable.

In the present embodiment, instead of the portable, the key unit 100 transmits and receives the RF band and LF band radio waves to and from the locking/unlocking device 300, so as to control locking and unlocking of the door of the vehicle 10. Hereinafter, the description is made on the premise that a communication counterpart of the locking/unlocking device 300 is limited to the key unit 100, unless otherwise specified.

The locking/unlocking device 300 includes an LF transmitter 301, an RF receiver 302, a verification ECU 303, a body ECU 304, and a door lock actuator 305. The LF transmitter 301 is means to transmit a radio wave in a low frequency band (e.g., 100 KHz to 300 KHz) for searching (polling) the key unit 100. The LF transmitter 301 is provided near a center console or a handle in the vehicle cabin, for example. The RF receiver 302 is means for receiving a radio wave in a high frequency band (e.g., 100 MHz to 1 GHz) transmitted from the key unit 100. The RF receiver 302 is provided in any place inside the vehicle cabin.

The verification ECU 303 is a computer for performing a control to lock and unlock the doors of the vehicle cabin and the trunk of the vehicle 10 based on a signal (a locking signal or an unlocking signal) transmitted from the key unit 100 via the radio wave in the RF band. The verification ECU 303 is constituted by a microcomputer, for example. Note that, in the following description, the locking signal and the unlocking signal are collectively referred to as a locking/unlocking signal. The term "locking/unlocking signal" indicates at least either one of the locking signal and the unlocking signal.

The verification ECU 303 authenticates that the locking/unlocking signal transmitted from the key unit 100 is transmitted from a rightful device. More specifically, the verification ECU 303 determines whether or not a key ID included in the locking/unlocking signal agrees with a key ID stored in advance in a storage portion (not shown) included in the verification ECU 303. Then, the verification ECU 303 transmits an unlock command or a lock command to the body ECU 304 based on the result of the determination. The unlock command or the lock command is transmitted via an in-vehicle network such as a controller area network (CAN).

The door lock actuator 305 is an actuator configured to lock and unlock doors of the vehicle 10. The doors of the vehicle 10 include a vehicle-cabin door opened and closed when a passenger gets in and off the vehicle cabin as a passenger space and a trunk door opened and closed at the time of loading and unloading the trunk, for example. The door lock actuator 305 works based on a signal transmitted from the body ECU 304. Note that the door lock actuator 305 may be configured to lock and unlock the vehicle-cabin door and the trunk door in the vehicle 10 independently.

The body ECU 304 is a computer for performing a body control of the vehicle 10. The body ECU 304 has a function to perform locking and unlocking of the vehicle-cabin door and the trunk door of the vehicle 10 at the same time or independently by controlling the door lock actuator 305 based on the lock command or the unlock command received from the verification ECU 303. Note that the verification ECU 303 and the body ECU 304 may be integrated.

Descriptions are now made of the key unit 100. The key unit 100 is a device placed at a predetermined position (for example, inside a glove compartment) in the vehicle cabin of the vehicle 10. The key unit 100 has a function to authenticate the user terminal 200 of the collection/delivery user via short-distance wireless communication with the user terminal 200 and the like, and a function to transmit a locking/unlocking signal by use of the radio wave in the RF band based on the authentication result. The key unit 100 is constituted by an LF receiver 101, an RF transmitter 102, a short-distance communication portion 103, and a controlling portion 104.

The LF receiver 101 is means to receive a polling signal transmitted from the locking/unlocking device 300 via the radio wave in the LF band. The LF receiver 101 includes an antenna (hereinafter referred to as an LF antenna) configured to receive the radio wave in the LF band. The RF transmitter 102 is means to transmit a locking/unlocking signal to the locking/unlocking device 300 via the radio wave in the RF band.

The short-distance communication portion 103 is means to communicate with the user terminal 200 of the collection/delivery user. The short-distance communication portion 103 performs communication in a short distance (to such a degree that communication can be performed between the inside of the vehicle cabin and the outside of the vehicle cabin) by use of a predetermined wireless communication standard. In the first embodiment, the short-distance communication portion 103 performs data communication by the Bluetooth (registered trademark) Low Energy standard (hereinafter referred to as BLE). The BLE is a low power telecommunications standard by Bluetooth and has a feature to start communication immediately by detecting a counterpart without requiring pairing between devices. Note that the present embodiment exemplifies the BLE, but other wireless communication standards are also usable. For example, a near field communication (NFC), an ultra-wide band (UWB), WiFi (registered trademark), and the like can be used.

The controlling portion 104 is a computer configured to perform short-distance wireless communication with the user terminal 200 of the collection/delivery user via the short-distance communication portion 103 and to perform a control to authenticate the user terminal 200 and a control to transmit a locking/unlocking signal based on the authentication result. The controlling portion 104 is constituted by a microcomputer, for example.

The controlling portion 104 includes a storage portion 1041 and an authentication portion 1042. A control program to control the key unit 100 is stored in the storage portion 1041. The controlling portion 104 may implement various functions including the authentication portion 1042 by causing a central processing unit (CPU) (not shown) included in a microcomputer constituting the controlling portion 104 to execute control programs stored in the storage portion 1041. For example, the controlling portion 104 implements a function to receive a polling signal transmitted from the locking/unlocking device 300 as the radio wave in the LF band via the LF receiver 101, a function to transmit a locking/unlocking signal as the radio wave in the RF band to the locking/unlocking device 300 via the RF transmitter 102, a function to process communication with the user terminal 200 of the collection/delivery user via the short-distance communication portion 103, a function to generate a locking/unlocking signal when authentication of the user terminal 200 of the collection/delivery user is successfully performed by the authentication portion 1042, and so on.

The authentication portion 1042 authenticates the user terminal 200 based on authentication information included in a lock request or an unlock request (hereinafter collectively referred to as a lock/unlock request) transmitted from the user terminal 200 of the collection/delivery user. More specifically, the authentication portion 1042 compares authentication information stored in the storage portion 1041 with the authentication information transmitted from the user terminal 200 of the collection/delivery user, and when they are in a predetermined relationship, the authentication portion 1042 determines that the authentication is successfully performed. When both pieces of authentication information do not satisfy the predetermined relationship, the authentication portion 1042 determines that the authentication is failure. Here, the predetermined relationship includes a case where the authentication information stored in the storage portion 1041 agrees with the authentication information transmitted from the user terminal 200 of the collection/delivery user, a case where processing results of predetermined encryption/decryption or the like using two pieces of authentication information agree with each other, a case where a result of a decryption process performed on one of the two pieces of authentication information agrees with the other one of them, and so on.

When the authentication portion 1042 successfully authenticates the user terminal 200 of the collection/delivery user, a locking/unlocking signal generated in response to a request received from the user terminal 200 is transmitted to the locking/unlocking device 300 via the RF transmitter 102. Hereinafter, the authentication information stored in the key unit 100 is referred to as device authentication information, and the authentication information transmitted from the user terminal 200 of the collection/delivery user is referred to as terminal authentication information, as needed for description.

Further, the key unit 100 transmits the key ID to the locking/unlocking device 300 together with the locking/unlocking signal. The key ID may be stored in the key unit 100 in advance as a plain text, or may be stored in an encrypted state where the key ID is encrypted by a cipher code inherent to the user terminal 200 of the collection/delivery user. When the key ID is stored in the encrypted state, the key ID thus encrypted may be decrypted by the authentication information transmitted from the user terminal 200 of the collection/delivery user, so that an original key ID may be obtained.

As such, the in-vehicle device 10A operates the locking/unlocking device 300 through the authentication process performed by the key unit 100, based on the authentication information transmitted from the user terminal 200, and performs a series of processes of locking/unlocking the vehicle cabin and the trunk of the vehicle 10. The series of processes is a locking/unlocking process by the in-vehicle device 10A and corresponds to a locking/unlocking process by a locking/unlocking control device.

Descriptions are now made of the user terminal 200 of the collection/delivery user. The user terminal 200 is a small and portable computer such as a smartphone, a mobile phone terminal, a tablet terminal, a personal information terminal, and a wearable computer (a smart watch and the like), for example. Note that the user terminal 200 may be a personal computer (PC) connected to the collection/delivery management server 500 via the network N1 such as the Internet that is the public communication network. The user terminal 200 of the collection/delivery user is constituted by a short-distance communication portion 201, a communication portion 202, a controlling portion 203, and an input/output portion 204.

The short-distance communication portion 201 is means to communicate with the key unit 100 by the same telecommunications standard as the short-distance communication portion 103 of the key unit 100. The network formed between the short-distance communication portion 201 and the key unit 100 is a network indicated by the network N2 in FIG. 1. The communication portion 202 is communication means to connect the user terminal 200 to the network N1. In the first embodiment, the user terminal 200 can communicate with other devices (e.g., the collection/delivery management server 500 and so on) via the network N1 by use of a mobile communication service such as 3rd generation (3G) and long term evolution (LTE).

The controlling portion 203 is a computer for managing a control of the user terminal 200. The controlling portion 203 performs, for example, a process of acquiring the terminal authentication information, a process of generating a lock/unlock request including the acquired terminal authentication information, a process of transmitting the generated lock/unlock request to the key unit 100, and the like. Note that the controlling portion 203 is constituted by a microcomputer, for example. The microcomputer is provided with a storage unit and a processor, for example. When programs stored in the storage unit (a read only memory (ROM) and the like) provided in the microcomputer are executed by a processor (CPU or the like (not shown)) provided in the microcomputer, functions to perform various processes described above are implemented.

Further, the controlling portion 203 performs interaction with the collection/delivery user via the input/output portion 204. The input/output portion 204 is means to receive an input operation performed by the collection/delivery user and provide information to the collection/delivery user. More specifically, the input/output portion 204 is constituted by a touch panel, its control means, a liquid crystal display, and its control means. The touch panel and the liquid crystal display are constituted by one touch panel display in the first embodiment.

The controlling portion 203 displays an operation screen on the input/output portion 204 and generates a lock/unlock request corresponding to the operation performed by the collection/delivery user. For example, the controlling portion 203 outputs an icon for unlocking, an icon for locking, and the like to the touch panel display, and generates an unlock request and a lock request based on the operation performed by the collection/delivery user. Note that the operation performed by the collection/delivery user is not limited to an operation performed via the touch panel display. For example, the operation may be an operation performed via a hardware switch and the like.

Further, the controlling portion 203 performs a process of acquiring terminal authentication information from the center server 400. Note that the terminal authentication information is not information (a key ID) based on which the locking/unlocking device 300 authenticates the key unit 100, but is information based on which the key unit 100 authenticates the user terminal 200. The information based on which the key unit 100 authenticates the user terminal 200 is, for example, authentication information corresponding to authentication information inherent to the key unit 100 provided in the vehicle 10. More specifically, the controlling portion 203 causes the communication portion 202 to transmit an issue request of terminal authentication information to the center server 400 via the collection/delivery management server 500. The "issue request of terminal authentication information" as used herein includes identification information of the user terminal 200, identification information of the collection/delivery package, and a signal for requesting an issue of terminal authentication information inherent to the key unit 100.

The center server 400 that receives the issue request of the terminal authentication information transmits the terminal authentication information inherent to the key unit 100 provided in the vehicle 10 to the user terminal 200. Hereby, an operation to unlock the vehicle 10 is performable by the user terminal 200. Note that, when the user terminal 200 does not have the terminal authentication information, a lock operation and an unlock operation from an operation screen to the vehicle 10 cannot be performed.

In the first embodiment, the terminal authentication information acquired by the user terminal 200 may be a one-time key that is invalidated when the vehicle-cabin door or the trunk door is locked along with the end of the collection/delivery operation by the collection/delivery user, for example. For example, at the timing when terminal authentication information transmitted from the center server 400 is received by the user terminal 200, the terminal authentication information is stored in a storage portion (not shown) of the user terminal 200, and after that, at the timing when a lock notice transmitted from the key unit 100 is received by the user terminal 200 when the trunk door is locked along with the end of the collection/delivery operation, the terminal authentication information is deleted from the storage portion.

Note that the timing when the terminal authentication information stored in the storage portion of the user terminal 200 is deleted is not limited to the above example, and may be the timing when a predetermined time has elapsed from a point of time when the user terminal 200 receives the terminal authentication information transmitted from the center server 400 (or a point of time when the center server 400 transmits the terminal authentication information toward the user terminal 200). Further, the terminal authentication information is not limited to the one-time key mentioned above and may be a limited key that is valid only during a predetermined time zone. Regardless of whether the terminal authentication information is a one-time key or a limited key, device authentication information corresponding to the terminal authentication information is stored in the key unit 100 in advance.

Descriptions are now made of the user terminal 50 of the client user. Similarly to the user terminal 200, the user terminal 50 may be a small computer such as a smartphone, a mobile phone terminal, a tablet terminal, a personal information terminal, and a wearable computer (a smart watched and the like) or may be a personal computer. The user terminal 50 of the client user is constituted by a communication portion 51, a controlling portion 52, and an input/output portion 53.

The communication portion 51 is functionally equivalent to the communication portion 202 and is communication means to connect the user terminal 50 to the network N1. The controlling portion 52 is a computer for managing a control of the user terminal 50. The controlling portion 52 is constituted by a microcomputer, for example. When programs stored in a storage unit (ROM or the like) provided in the microcomputer are executed by a CPU (not shown) provided in the microcomputer, functions to perform various processes are implemented.

The controlling portion 52 executes, for example, a browser application or an application of the EC site and orders a product to the EC site server 600 via the communication portion 51. The controlling portion 52 also transmits, to the EC site server 600, information on designated collection/delivery date and time and a designated collection/delivery place, a payment method, and the like, input via the input/output portion 53, as well as the order of the product, for example.

Further, the controlling portion 52 executes, for example, the browser application or an application of a site for a collection/delivery request, so as to request collection/delivery to the collection/delivery management server 500 via the communication portion 51. The controlling portion 52 transmits, to the collection/delivery management server 500, the designated collection/delivery date and time and the designated collection/delivery place, attribute information of a package, and so on, input via the input/output portion 53, as well as the collection/delivery request.

The input/output portion 53 is also functionally similar to the input/output portion 204 and is means to receive an input operation performed by the client user and provide information to the client user.

Note that, in FIG. 2, the user terminal 50 does not have a configuration corresponding to the short-distance communication portion 201 explicitly, but the user terminal 50 may have such a configuration so that the locking/unlocking device 300 is operated from the user terminal 50 such that the controlling portion 52 performs a process of acquiring terminal authentication information from the center server 400, like the controlling portion 203, and transmits the terminal authentication information to the key unit 100 via short-distance wireless communication.

Descriptions are now made of the collection/delivery management server 500. The collection/delivery management server 500 has a configuration of a general computer, and when a plurality of operators participates in the trunk share system 1 as described above, each of the operators prepares at least one collection/delivery management server as its own management server. The collection/delivery management server 500 is a computer including a processor (not shown) such as a CPU or a DSP, a main storage portion (not shown) such as a random access memory (RAM) and a ROM, and an auxiliary storage portion (not shown) such as an erasable programmable ROM (EPROM), a hard disk drive (HDD), and a removable medium.

Further, the collection/delivery management server 500 includes a communication portion 501. The communication portion 501 is connected to other devices so as to perform communication between the collection/delivery management server 500 and the other devices (e.g., the center server 400, the user terminal 200, and the like). The communication portion 501 is, for example, a local area network (LAN) interface board or a radio communications circuit for wireless communication. The LAN interface board or the radio communications circuit is connected to the network N1 such as the Internet that is a public communication network.

Further, the collection/delivery management server 500 includes a collection/delivery management database (DB) 503 in which collection/delivery information about a target package to be collected/delivered is stored. The collection/delivery information is information including information such as collection/delivery date and time of the package, a collection/delivery place for the package, information about a status of the collection/delivery package, and the like, in addition to attribute information of the package. The collection/delivery management DB 503 is formed such that the collection/delivery information is stored in the auxiliary storage portion. The collection/delivery management DB 503 is established such that a program of a database management system (DBMS) to be executed by a processor manages data to be stored in the auxiliary storage portion, for example. The collection/delivery management DB 503 is, for example, a relational database.

In the collection/delivery management server 500, the controlling portion 502 as a function part is formed by execution of a program by the processor. The controlling portion 502 performs a management control such as registration and update of the collection/delivery information to the collection/delivery management DB 503. For example, when the controlling portion 502 receives a delivery request of a product from the EC site server 600 or receives a collection/delivery request from the client user via the user terminal 50, the controlling portion 502 generates collection/delivery information and stores the collection/delivery information in the collection/delivery management DB 503. Information used for generation of the collection/delivery information is, for example, received from the EC site server 600 or the user terminal 50 of the client user together with the collection/delivery request.

Further, in a case where a notification of change of information on the collection/delivery date and time or the collection/delivery place is input from the client user, the center server 400, or the like after the collection/delivery information is generated, the controlling portion 502 updates the stored collection/delivery information in accordance with the change. Further, the controlling portion 502 communicates with the user terminal 200 of the collection/delivery user via the communication portion 501 and updates information about the status of the collection/delivery package, included in the collection/delivery information. For example, the controlling portion 502 receives, from the user terminal 200, status information (e.g., information indicative of completion of collection/delivery) input by the collection/delivery user via the input/output portion 204, and updates corresponding collection/delivery information.

Further, when the controlling portion 502 receives a collection/delivery request from the client user via the user terminal 50 so that the vehicle 10 is designated as a collection/delivery place, the controlling portion 502 requests the center server 400 to perform a vehicle collection/delivery determination about the requested collection/delivery package. The controlling portion 502 transmits collection/delivery information corresponding to the collection/delivery package to the center server 400 together with the request of the vehicle collection/delivery determination. When the controlling portion 502 receives, from the center server 400, a notification of a determination result indicating that the vehicle 10 is suitable as the collection/delivery place (hereinafter referred to as "package deliverable to vehicle"), the controlling portion 502 confirms the collection/delivery request from the client user, for example. When the controlling portion 502 receives, from the center server 400, a notification of a determination result indicating that the vehicle 10 is not suitable as the collection/delivery place (hereinafter referred to as "package undeliverable to vehicle"), the controlling portion 502 transmits a change request of the collection/delivery place to the user terminal 50 of the client user, for example, so as to urge the client user to select a collection/delivery place except the vehicle 10.

Further, the controlling portion 502 transmits an instruction of collection/delivery to the user terminal 200 of the collection/delivery user so that the collection/delivery user can collect/deliver the collection/delivery package. The address of the collection/delivery place, and the like are also notified together with the instruction of collection/delivery. Further, in a case where the collection/delivery place is the vehicle 10, a license number of the vehicle 10, a vehicle position, and the like are also notified. Information for the collection/delivery user to specify the vehicle 10 such as the license number of the vehicle 10 is stored in the collection/delivery management DB 503, for example.

Note that the instruction of collection/delivery may be transmitted to the user terminal 200 not only once but several times. For example, on the day before a scheduled collection/delivery date, collection/delivery instructions related to collection/delivery on the next day may be collectively transmitted to the user terminal 200 of the collection/delivery user, and the collection/delivery instructions may be transmitted again on the scheduled collection/delivery date. Note that, in a case where the collection/delivery information is updated at the time of the second transmission, the update content is reflected.

Any of functional constituents of the collection/delivery management server 500 or some of processes thereof may be performed by other computers connected to the network N1. Further, a series of processes performed by the collection/delivery management server 500 can be performed by hardware and can be also performed by software.

Descriptions are now made of the EC site server 600. The EC site server 600 also has a configuration of a general computer and a basic hardware configuration thereof is the same as the collection/delivery management server 500. The EC site server 600 includes a processor (not shown), a main storage portion, and an auxiliary storage portion. Accordingly, a program stored in the auxiliary storage portion is loaded in a working area of the main storage portion and executed so that each constituent part and the like is controlled through the execution of the program, thereby making it possible to implement a function corresponding to a predetermined object. Further, the EC site server 600 also includes a communication portion 601. The communication portion 601 is functionally equivalent to the communication portion 501 included in the collection/delivery management server 500 and performs communication between the EC site server 600 and other devices (e.g., the center server 400, the collection/delivery management server 500, the user terminal 50 of the client user, and so on).

Further, the EC site server 600 includes an order management DB 603 in its auxiliary storage portion. The order management DB 603 is established such that a program of a database management system to be executed by a processor manages data to be stored in the auxiliary storage portion, for example. The order management DB 603 is, for example, a relational database. Order information of a product and the like is stored in the order management DB 603.

In the EC site server 600, the controlling portion 602 as a function part is formed by execution of the program by the processor. The controlling portion 602 performs a management control such as registration and update of the order information to the order management DB 603. For example, when the controlling portion 602 receives an order of a product from the client user via the user terminal 50, the controlling portion 602 generates order information corresponding to the client user and stores it in the order management DB 603. The order information includes, for example, attribute information of a package, designated collection/delivery date and time, and a designated collection/delivery place. Further, those pieces of information used as the order information are, for example, received from the user terminal 50 of the client user together with the order of the product.

Further, when the controlling portion 602 receives an order of a product from the client user via the user terminal 50 so that the vehicle 10 is designated as a collection/delivery place, the controlling portion 602 requests the center server 400 to perform a vehicle collection/delivery determination about the product thus ordered. The controlling portion 602 transmits order information corresponding to the order to the center server 400 together with the request of the vehicle collection/delivery determination. When the controlling portion 602 receives, from the center server 400, a notification of a determination result indicating that the product is deliverable to the vehicle, the controlling portion 602 confirms the order from the client user, for example. When the controlling portion 602 receives, from the center server 400, a notification of a determination result indicating that the product is undeliverable to the vehicle, the controlling portion 602 transmits a change request of the collection/delivery place to the user terminal 50 of the client user, for example, so as to urge the client user to designate a collection/delivery place except the vehicle 10.

Any of functional constituents of the EC site server 600 or some of processes thereof may be executed by other computers connected to the network N1. Further, a series of processes executed by the EC site server 600 can be executed by hardware and can be also executed by software.

Next will be described the center server 400. The center server 400 also has a configuration of a general computer and a basic hardware configuration thereof is the same as the collection/delivery management server 500. The center server 400 includes a processor (not shown), a main storage portion, and an auxiliary storage portion. Accordingly, a program stored in the auxiliary storage portion is loaded in a working area of the main storage portion and executed so that each constituent part and the like is controlled through the execution of the program, thereby making it possible to implement a function corresponding to a predetermined object. Further, the center server 400 also includes a communication portion 401. The communication portion 401 is functionally equivalent to the communication portion 501 included in the collection/delivery management server 500 and performs communication between the center server 400 and other devices (e.g., the collection/delivery management server 500, the EC site server 600, the user terminal 50 of the client user, and the like).

Further, the center server 400 includes, in the auxiliary storage portion, a user information DB 403, an authentication information DB 404, and a vehicle collection/delivery condition information DB 405. These databases (DB) are established such that a program of a database management system to be executed by a processor manages data to be stored in the auxiliary storage portion. The user information DB 403, the authentication information DB 404, the vehicle collection/delivery condition information DB 405 are, for example, relational data bases.

Information of a user who uses the vehicle 10 (e.g., the collection/delivery user who delivers a collection/delivery package to the vehicle 10 or the client user who collects the collection/delivery package thus delivered) is stored in the user information DB 403. The information of the user includes, for example, a password corresponding to the user, information on the vehicle 10 registered by the client user, package receivable schedule information of the client user, and so on.

Authentication information of the vehicle 10, corresponding to the terminal authentication information, is stored in the authentication information DB 404. The authentication information of the vehicle 10 is information associated with identification information (key ID) of the vehicle 10 and can be identification information inherent to the key unit 100 provided in the in-vehicle device 10A, for example. Further, in addition to the authentication information of the vehicle 10, an effective period (including an effective time zone) of the authentication information, information on whether the authentication information expires or not, and the like may be stored in the authentication information DB 404. The effective period of the authentication information may be transmitted to the user terminal 200 of the collection/delivery user together with the authentication information. When the user terminal 200 of the collection/delivery user receives the effective period of the authentication information, the user terminal 200 can delete the authentication information that exceeds its effective period, so as to invalidate the authentication information. Further, the information on whether the authentication information expires or not indicates whether the authentication information is transmitted to the user terminal 200 and is effective or the authentication information exceeds the effective period and expires. In a case where the authentication information is transmitted to the user terminal 200 and is effective, an authentication information managing portion 4021 (described below) prevents the authentication information from being issued with an overlapped effective period, thereby making it possible to prevent redundant issues of the authentication information.

In the vehicle collection/delivery condition information DB 405, information on determination conditions based on which it is determined whether the vehicle 10 is suitable as a collection/delivery place or not is stored. The conditions based on which it is determined whether the vehicle 10 is suitable as a collection/delivery place or not include a condition based on attributes of a package, a condition based on a surrounding environment around the vehicle 10, and so on. The surrounding environment around the vehicle 10 includes an area where the vehicle 10 is located, a season, a temperature, a time zone, a degree of sunlight, and the like, for example.

Further, in the center server 400, a controlling portion 402 as a function part is formed by execution of a program by the processor. The controlling portion 402 performs a vehicle collection/delivery determination process, an issue control process of authentication information to the user terminal 200, etc., and other processes. More specifically, the controlling portion 402 includes the authentication information managing portion 4021, a vehicle collection/delivery determination portion 4022, and a DB managing portion 4023 as function parts.

The authentication information managing portion 4021 performs an issue control process of authentication information for locking or unlocking the vehicle 10. More specifically, the authentication information managing portion 4021 receives an issue request of authentication information for locking or unlocking the vehicle 10 from the user terminal 200 of the collection/delivery user via the collection/delivery management server 500. The authentication information managing portion 4021 receives the issue request of the authentication information and information on the user terminal 200 as a destination to which the authentication information is issued. The authentication information managing portion 4021 transmits authentication information (terminal authentication information) corresponding to the key unit 100 to the user terminal 200 via the collection/delivery management server 500. The authentication information managing portion 4021 may generate authentication information including information on an effective period. Even in a case where the key unit 100 of the in-vehicle device 10A receives the authentication information including the information on the effective period, when the effective period expires, the key unit 100 of the in-vehicle device 10A determines that the authentication information is invalid and does not execute locking or unlocking of the vehicle 10.

The vehicle collection/delivery determination portion 4022 performs a vehicle collection/delivery determination process. More specifically, the vehicle collection/delivery determination portion 4022 receives a request of the vehicle collection/delivery determination from the EC site server 600 or the collection/delivery management server 500. The vehicle collection/delivery determination portion 4022 receives order information from the EC site server 600 and collection/delivery information corresponding to a collection/delivery package from the collection/delivery management server 500, together with the request of the vehicle collection/delivery determination, for example.

The vehicle collection/delivery determination portion 4022 determines whether or not the vehicle 10 is suitable as a collection/delivery place for a target package, as the vehicle collection/delivery determination process, based on attribute information of the package, included in the order information received from the EC site server 600 or the collection/delivery information received from the collection/delivery management server 500, and a condition stored in the vehicle collection/delivery condition information DB 405 based on which it is determined that the vehicle 10 is suitable as the collection/delivery place. The vehicle collection/delivery determination portion 4022 transmits a result of the vehicle collection/delivery determination process to the EC site server 600 or the collection/delivery management server 500 as a request source. The vehicle collection/delivery determination portion 4022 is an example of a "receiving portion," an "acquisition portion," a "controlling portion," and an "output portion." The request of the vehicle collection/delivery determination is an example of a "determination request to determine whether or not the vehicle is suitable as the collection/delivery place for a first package." The vehicle collection/delivery determination process is an example of a "determination process of determining whether or not the vehicle is suitable as the collection/delivery place for the first package."

The DB managing portion 4023 manages each DB included in the center server 400. More specifically, for example, the DB managing portion 4023 receives information transmitted from the user terminal 50 of the client user, the collection/delivery management server 500, and the EC site server 600 and registers or updates the information in a corresponding DB. Further, in response to a request from other functional constituents, the DB managing portion 4023 reads corresponding information from a corresponding DB.

Any of functional constituents of the center server 400 or some of processes thereof may be executed by other computers connected to the network N1. Further, a series of processes performed by the center server 400 can be performed by hardware and can be also performed by software.

FIG. 3 is an example of an order information table. The order information table is stored in the order management DB 603 of the EC site server 600, for example. For example, one entry in the order information table is order information. The order information table includes, for example, a client user ID field, an order ID field, a collection/delivery date and time designation field, a collection/delivery place field, a package size field, a package weight field, a cold product field, a frozen product field, an ID confirmation necessity field, a freight collect field, a cash-on-delivery field, a right-side-up-with-care field, a fragile product field, and an expensive product field.

Identification information to identify the client user is stored in the client user ID field. The identification information of the client user is identification information used commonly with the center server 400, the collection/delivery management server 500, and the EC site server 600 in the trunk share system 1, for example, and is issued by the center server 400 in advance. Alternatively, the center server 400, the collection/delivery management server 500, and the EC site server 600 may give respective pieces of identification information to the client user and may use them, respectively. In this case, the center server 400, the collection/delivery management server 500, and the EC site server 600 associate those pieces of identification information of the client user with each other by use of information such as a full name, an e-mail address, and a login name of the client user, for example.

Order identification information to identify an order is input in the order ID field. Upon receipt of the order, the controlling portion 602 of the EC site server 600 issues the order identification information, for example. Information on collection/delivery date and time designated by the client user is input into the collection/delivery date and time designation field.

Information indicative of a collection/delivery place designated by the client user is input into the collection/delivery place field. Values such as "home," "vehicle," and "office" are input into the collection/delivery place field, for example. Based on the values such as "home," "vehicle," and "office" input into the collection/delivery place field, the collection/delivery place field is associated (not shown) with the address of a delivery destination of a target package in the order information. As the information indicative of the collection/delivery place designated by the client user, identification information of an area may be used in the collection/delivery place field, for example. Identification information assigned to an area set, by a parcels delivery company that manages the collection/delivery management server 500, as a regional unit managed by one collection/delivery user may be used as the identification information of the area, for example.

In the package size field, the size of the package is stored. In the package weight field, the weight of the collection/delivery package is stored. In the cold product field, information indicative of whether the package is a cold product or not is input. For example, a symbol "O" is input when the package is a cold product and a symbol "-" is input when the package is not a cold product. In the frozen product field, information indicative of whether the package is a frozen product or not is input. For example, a symbol "O" is input when the package is a frozen product and a symbol "-" is input when the package is not a frozen product.

In the ID confirmation necessity field, information indicative of whether ID confirmation is required or not is input. The ID confirmation is to confirm that a recipient of the package is rightful, for example, based on an identification card and the like. In the freight collect field, information indicative of whether or not a shipping charge is designated to be paid on delivery is input. For example, a symbol "O" is input when a shipping charge is designated to be paid on delivery and a symbol "-" is input when a shipping charge is not designated to be paid on delivery. In the cash-on-delivery field, information indicative of whether or not cash on delivery is designated as a payment for the price of the product. For example, a symbol "O" is input when cash on delivery is designated as a payment for the price of the product and a symbol "-" is input when cash on delivery is not designated as a payment for the price of the product.

In the right-side-up-with-care field, information indicative of whether or not the product is designated to be placed right side up with care is input. For example, a symbol "O" is input when the product is designated to be placed right side up with care and a symbol "-" is input when the product is not designated to be placed right side up with care. In the fragile product field, information indicative of whether or not the product is designated as a fragile product is input. For example, a symbol "O" is input when the product is designated as a fragile product and a symbol "-" is input when the product is not designated as a fragile product. In the expensive product field, information indicative of whether the package is an expensive product or not is input. For example, a symbol "O" is input when the package is an expensive product and a symbol "-" is input when the package is not an expensive product.

The identification information of the client user, the designated collection/delivery date and time, and the designated collection/delivery place are transmitted from the user terminal 50 of the client user to the EC site server 600 together with the order of the product, for example. The following pieces of information included in the order information table, i.e., information on the package size, information on the package weight, information on whether or not the product is a cold product, information on whether or not the product is a frozen product, information on whether or not ID confirmation is required, information on whether freight collect is designated or not, information on whether cash on delivery is designated or not, information on whether or not the product should be placed right side up with care, information on whether or not the product is a fragile product, and information on whether or not the product is an expensive product, are examples of the attribute information of the package. Further, these pieces of attribute information of the package may be input into the user terminal 50 by the client user and transmitted from the user terminal 50 to the EC site server 600 together with the order of the product, for example, or a value determined for the product in advance may be input in the EC site server 600. Further, whether or not the product should be placed right side up with care, whether or not the product is a fragile product, and whether or not the product is an expensive product do not have clear definitions and are often determined by the subjective of the client user, the administrator of the EC site, a sales agency of the product, or the like.

The information on whether or not ID confirmation is required, the information on whether freight collect is designated or not, and the information on whether cash on delivery is designated or not are examples of information indicating that direct delivery to a recipient is required. The information indicative of whether the product is an expensive product or not is an example of information indicating that the package is highly likely to be stolen.

The collection/delivery information stored in the collection/delivery management DB 503 of the collection/delivery management server 500 includes generally the same information as the order information illustrated in FIG. 3. More specifically, the collection/delivery information includes a collection/delivery category (delivery or collection), a collection/delivery status, and identification information of the package instead of the order identification information, in addition to the identification information of the client user, the information of the collection/delivery date and time and the collection/delivery place designated by the client user, the information on the package size, the information on the package weight, the information on whether or not the product is a cold product, the information on whether or not the product is a frozen product, the information on whether or not ID confirmation is required, the information on whether freight collect is designated or not, the information on whether cash on delivery is designated or not, the information on whether or not the product should be placed right side up with care, the information on whether or not the product is a fragile product, and the information on whether or not the product is an expensive product. The attribute information of the package, included in the collection/delivery information, is included in the order information from the EC site server 600 or input information to the user terminal 50 of the client user, the order information or the input information being transmitted to the collection/delivery management server 500 together with the collection/delivery request, for example.

FIG. 4 is an example of a vehicle location information table. The vehicle location information table is a table in which information on a location of the vehicle registered by the client user as a collection/delivery place is stored. The vehicle location information table is stored in the user information DB 403 of the center server 400, for example. The vehicle location information table includes a client user ID field, a vehicle ID field, a vehicle position field, an inside/outside field, and a roof field, for example.

The identification information of the client user is input in the client user ID field. The identification information of the vehicle is input in the vehicle ID field. As the identification information of the vehicle, a vehicle identification number described on a number plate may be used, for example. Information indicative of a place where the vehicle is parked, e.g., "home," "parking lot," and the like, is input into the vehicle position field. Further, an address corresponding to a value such as "home" or "parking lot" in the vehicle position field is held in a table (not shown).

Information indicative of whether the place where the vehicle is parked is inside or outside is input in the inside/outside field. Information indicative of whether or not a roof is provided in the place where the vehicle is parked is input into the roof field. When information indicating that the vehicle is parked inside is input into the inside/outside field, information indicating that the roof is provided is input into the roof field. The inside/outside field and the roof field are examples of "information indicative of a degree of sunlight on the vehicle." Further, the vehicle position field is an example of "information indicative of a parking position of the first vehicle."

Note that the information of the vehicle position and the like, registered in the vehicle location information table, are registered in advance in the center server 400 by execution of an application, by the client user, to use the service of the trunk share system 1 by use of the user terminal 50. Further, vehicle location information registered in the vehicle location information table is a default value of the position of the vehicle 10. Further, the registration of the vehicle location information in the vehicle location information table is not essential and may be performed selectively. Since the vehicle 10 moves, the vehicle 10 may not necessarily be present at the position registered in the vehicle location information. On this account, in a case where the center server 400 uses a current position of the vehicle 10, the center server 400 may inquire of the user terminal 50 of the client user, a data communication device provided in the vehicle 10, or the like about the current position of the vehicle 10, for example. Details of the data communication device provided in the vehicle 10 will be described later in the second embodiment.

FIG. 5 is an example of a user receivable time zone information table. Information on a time zone when the client user can receive the package in the vehicle 10 is stored in the user receivable time zone information table. The user receivable time zone information table is stored in the user information DB 403 of the center server 400, for example. The user receivable time zone information table includes, for example, a client user ID field, a collection/delivery place field, and a time zone field. The identification information of the client user is input in the client user ID field. The identification information of the vehicle 10 is input in the collection/delivery place field.

In the example illustrated in FIG. 5, the time zone field includes five time zones for each day. The time zones are set to time zones when a parcels delivery company can deliver a package, for example. For example, the five time zones are set as follows: a first time zone ("1" in FIG. 5) is during morning hours (until 12:00); a second time zone is from 12:00 to 14:00; a third time zone is from 14:00 to 16:00; a fourth time zone is from 16:00 to 18:00; and a fifth time zone is from 18:00 to 20:00. In the time zone field, a symbol "O" is input in a time zone when the client user can receive the package in the vehicle 10. In the meantime, a symbol "X" is input in a time zone when the client user cannot receive the package in the vehicle 10.

The user receivable time zone is registered in advance in the center server 400 by execution of an application, by the client user, to use the service of the trunk share system 1 by use of the user terminal 50. Further, the user receivable time zone can be changed appropriately by execution of the application to use the service of the trunk share system 1 by use of the user terminal 50. The client user is an example of a "user who has a right to designate the first vehicle as a collection/delivery place." Information on the user receivable time zone is an example of "package deliverable schedule information in the first vehicle for the user who has a right to designate the first vehicle as the collection/delivery place."

FIG. 6 is an example of a package attribute condition table. The package attribute condition table is a table that defines an attribute of a package based on which it is determined whether the vehicle 10 is suitable as a collection/delivery place or not. The package attribute condition table is stored in the vehicle collection/delivery condition information DB 405 of the center server 400, for example. The package attribute condition table includes a package-deliverable-to-vehicle field, a package-undeliverable-to-vehicle field, and a determination-required field. In the package-deliverable-to-vehicle field, attribute information of a package as one of determination conditions based on which it is determined that the vehicle 10 is suitable as the collection/delivery place is stored. In the package-undeliverable-to-vehicle field, attribute information of the package as one of determination conditions based on which it is determined that the vehicle 10 is not suitable as the collection/delivery place is stored. In the determination-required field, attribute information of the package based on which a determination process to determine whether or not the vehicle 10 is suitable as the collection/delivery place is stored.

In the example illustrated in FIG. 6, as the attribute information of the package deliverable to the vehicle, information indicating that the package should be placed right side up with care is registered. In the example illustrated in FIG. 6, as the attribute information of the package undeliverable to the vehicle, information indicative of a frozen product, information indicating that ID confirmation is required, information indicative of freight collect, and information indicative of cash on delivery are registered. The information indicative of a frozen product is set to the package-undeliverable-to-vehicle field because the product is more likely to defrost and decrease in quality if the package is left after the package is delivered in the vehicle cabin or the trunk of the vehicle 10 until its recipient takes the package out of the vehicle 10. Any of the information indicating that ID confirmation is required, the information indicative of freight collect, and the information indicative of cash on delivery is set to the package-undeliverable-to-vehicle field because the package is required to be directly handed to the recipient, and therefore, when the vehicle 10 is selected as the collection/delivery place, the recipient is more likely to be absent in the vehicle 10. In the example illustrated in FIG. 6, as the attribute information of the package that requires a determination, information indicative of a cold product, information indicative of a fragile product, and information indicative of an expensive product are registered. The information indicative of a cold product, the information indicative of a fragile product, and the information indicative of an expensive product are set to the determination-required field because whether the vehicle 10 is usable as the collection/delivery place or not changes depending on the state of the vehicle 10.

Note that the definitions of respective pieces of attribute information to be set to the package-deliverable-to-vehicle field, the package-undeliverable-to-vehicle field, and the determination-required field as illustrated in FIG. 6 are examples and can be appropriately added, changed, and deleted by an administrator of the trunk share system 1. The attribute information to be set in "PACKAGE UNDELIVERABLE TO VEHICLE" in the package attribute condition table is an example of "attribute information of a package for which a vehicle is not suitable as a collection/delivery place." The attribute information, "COLD PRODUCT" and "EXPENSIVE PRODUCT," set in "DETERMINATION REQUIRED" in the package attribute condition table is an example of "attribute information for which surrounding environment condition information is used in a determination process."

FIG. 7 is an example of an environmental condition table. The environmental condition table is a table that defines conditions of the surrounding environment around the vehicle 10 as one of determination conditions based on which it is determined that the vehicle 10 is suitable as the collection/delivery place as for a package having, as attribute information, information indicative of a cold product. The environmental condition table is stored in the vehicle collection/delivery condition information DB 405 of the center server 400, for example. In the environmental condition table, information indicating whether or not the vehicle 10 is usable as the collection/delivery place for the package having, as attribute information, the information indicative of a cold product is input in accordance with a vehicle position, a season, and a time zone.

In the example illustrated in FIG. 7, the vehicle position includes an inside field, an outside field (with roof), and an outside field (without roof). In the example illustrated in FIG. 7, a summer field and a winter field are provided as the season. In the example illustrated in FIG. 7, five time zone fields similar to those in the user receivable time zone information table are provided as the time zone. For example, the summer is defined from May to October and the winter is defined from November to April. For example, when the vehicle 10 is usable as the collection/delivery place for the package having an attribute as a cold product, a symbol "O" is input in corresponding fields. For example, when the vehicle 10 is not usable as the collection/delivery place for the package having information indicative of a cold product as attribute information, a symbol "X" is input in corresponding fields.

In the example illustrated in FIG. 7, it is defined that, in the summer, the vehicle 10 is not usable as the collection/delivery place for the package having information indicative of a cold product as attribute information in any time zone and in any vehicle position. Further, in the example illustrated in FIG. 7, it is defined that, in the winter, when the vehicle position is inside or outside (with roof), the vehicle 10 is usable as the collection/delivery place for the package having information indicative of a cold product as attribute information in the first, fourth, and fifth time zones. Further, in the example illustrated in FIG. 7, it is defined that, in the winter, when the vehicle position is outside (without roof), the vehicle 10 is usable as the collection/delivery place for the package having information indicative of a cold product as attribute information in the first and fifth time zones.

Note that, as illustrated in FIG. 7, the definition on whether or not the vehicle 10 is usable as the collection/delivery place for the package having information indicative of a cold product as attribute information is an example and can be changed appropriately by the administrator of the trunk share system 1. Further, in FIG. 7, a temperature may be used as the information indicating the surrounding environment around the vehicle 10 instead of the summer, the winter, and the time zone. The season, the temperature, and the time zone are examples of "surrounding environment condition information about a surrounding environment around a vehicle." For example, the season and the time zone in the example illustrated in FIG. 7 are examples of "date and time condition information about date and time when the vehicle is suitable or not suitable as the collection/delivery place." For example, in the example illustrated in FIG. 7, the inside field, the outside field (with roof), and the outside field (without roof) as the vehicle position are examples of "sunshine condition information indicative of a degree of sunlight under which the vehicle is suitable or not suitable as the collection/delivery place."

Procedure of Process

Figure 8:
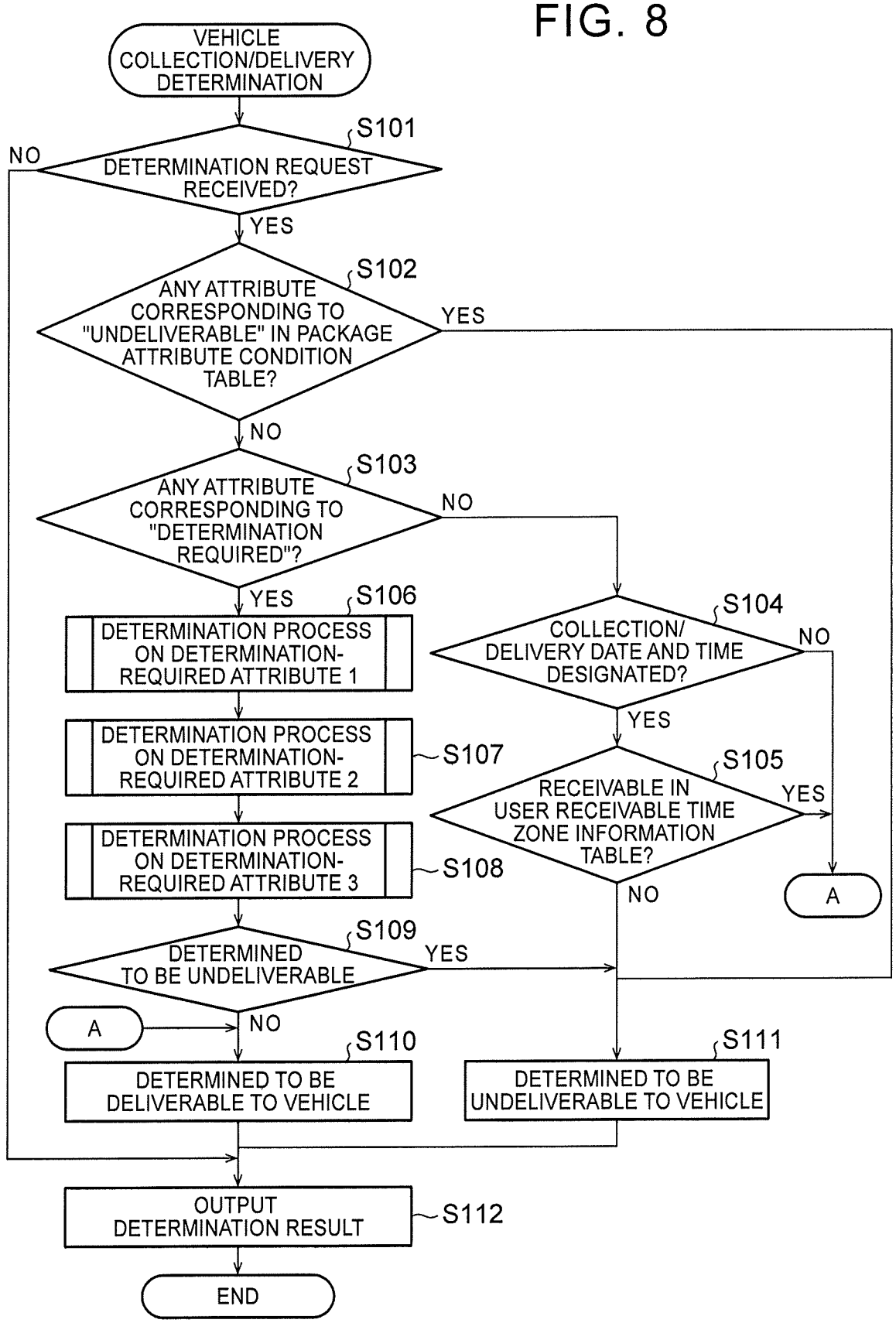
FIG. 8 is an example of a flowchart of a vehicle collection and delivery determination process performed in the center server.

FIG. 8 is an example of a flowchart of a vehicle collection/delivery determination process performed in the center server 400. The vehicle collection/delivery determination process illustrated in FIG. 8 is performed repeatedly at a predetermined cycle. A main body that performs the process illustrated in FIG. 8 is a CPU provided in the center server 400, but for convenience, the description is made on the premise that the vehicle collection/delivery determination portion 4022 that is a functional constituent serves as the main body. Flowcharts described hereinafter will be also described with corresponding functional constituents serving as the main body.

In S101, the vehicle collection/delivery determination portion 4022 determines whether a request of a vehicle collection/delivery determination is received or not. The request of the vehicle collection/delivery determination is transmitted from the EC site server 600 or the collection/delivery management server 500, for example. Order information including attribute information of a target package (from the EC site server 600) or collection/delivery information (from the collection/delivery management server 500) is also transmitted, for example, as well as the request of the vehicle collection/delivery determination. Note that the target package is a package for which the vehicle 10 is designated as the collection/delivery place. Further, the request of the vehicle collection/delivery determination may be also generated from other processes in the center server 400, for example. When an affirmative determination is made in S101, the process proceeds to S102. When a negative determination is made in S101, the process illustrated in FIG. 8 is ended. The process of receiving the request of the vehicle collection/delivery determination in S101 is an example of a process of a "receiving portion" "receiving a determination request." Further, the process of receiving the order information including the attribute information of the target package or the collection/delivery information as well as the request of the vehicle collection/delivery determination in S101 is an example of a process of an "acquisition portion" "acquiring attribute information of a first package." Note that the order information including the attribute information of the target package or the collection/delivery information is not limited to being acquired such that the order information or the collection/delivery information is received together with the request of the vehicle collection/delivery determination, and may be acquired by making an inquiry to the EC site server 600 or the collection/delivery management server 500 after the request of the vehicle collection/delivery determination is received.

In S102, the vehicle collection/delivery determination portion 4022 determines whether or not the target package has attribute information set in "PACKAGE UNDELIVERABLE TO VEHICLE" in the package attribute condition table. When an affirmative determination is made in S102, the process proceeds to S111, and when a negative determination is made in S102, the process proceeds to S103.

In S103, the vehicle collection/delivery determination portion 4022 determines whether or not the target package has attribute information set in "DETERMINATION REQUIRED" in the package attribute condition table. When an affirmative determination is made in S103, the process proceeds to S106, and when a negative determination is made in S103, the process proceeds to S104.

The processes of S104 and S105 are processes performed when a negative determination is made in S102 and S103, that is, when the target package does not have the attribute information set in "PACKAGE UNDELIVERABLE TO VEHICLE" and the attribute information set in "DETERMINATION REQUIRED" in the package attribute condition table.

In S104, the vehicle collection/delivery determination portion 4022 determines whether or not collection/delivery date and time are designated for the target package. The designated collection/delivery date and time for the target package are included in the order information or the collection/delivery information received together with the request of the vehicle collection/delivery determination, for example. When an affirmative determination is made in S104, the process proceeds to S105. When a negative determination is made in S104, the process proceeds to S110, and in S110, the vehicle collection/delivery determination portion 4022 determines that the package is deliverable to the vehicle.

In S105, the vehicle collection/delivery determination portion 4022 determines whether or not a day and a time zone specified in the designated collection/delivery date and time for the target package correspond to "RECEIVABLE" in the user receivable time zone information table. When an affirmative determination is made in S105, the process proceeds to S110, and in S110, the vehicle collection/delivery determination portion 4022 determines that the package is deliverable to the vehicle. When a negative determination is made in S105, the process proceeds to S111, and in S111, the vehicle collection/delivery determination portion 4022 determines that the package is undeliverable to the vehicle.

The processes from S106 to S109 are processes performed when the target package has attribute information set in "DETERMINATION REQUIRED" in the package attribute condition table. The determination processes from S106 to S108 for attribute information that requires a determination are a determination process of determining whether or not the vehicle 10 is suitable as the collection/delivery place for the target package, in terms of the attribute information set in "DETERMINATION REQUIRED" in the package attribute condition table. Hereinafter, the determination process of determining whether or not the vehicle 10 is suitable as the collection/delivery place for the target package in terms of the attribute information set in "DETERMINATION REQUIRED" is referred to as a determination-required attribute determination process.

The process illustrated in FIG. 8 is premised on the package attribute condition table illustrated in FIG. 6, and the package attribute condition table illustrated in FIG. 6 includes three pieces of attribute information set in "DETERMINATION REQUIRED." Accordingly, the example illustrated in FIG. 8 also includes three determination-required attribute determination processes (S106 to S108). The number of determination-required attribute determination processes varies in accordance with the number of pieces of attribute information set in "DETERMINATION REQUIRED" in the package attribute condition table, for example.

In FIG. 8, a determination process on a determination-required attribute 1 in S106 is a determination process performed when the package has information indicative of a cold product as attribute information. A determination process on a determination-required attribute 2 in S107 is a determination process performed when the package has information indicative of a fragile product as attribute information. A determination process on a determination-required attribute 3 in S108 is a determination process performed when the package has information indicative of an expensive product as attribute information. Details of the determination-required attribute determination processes will be described later. Each of the determination-required attribute determination processes is performed to determine whether or not the vehicle 10 is suitable as the collection/delivery place for the target package. Note that the processes from S106 to S108 may be performed in any order.

In S109, the vehicle collection/delivery determination portion 4022 determines whether or not any of the determination-required attribute determination processes from S106 of S108 has a determination result indicating that the package is undeliverable to the vehicle. When an affirmative determination is made in S109, the process proceeds to S111, and in S111, the vehicle collection/delivery determination portion 4022 determines that the package is undeliverable to the vehicle. When a negative determination is made in S109, the process proceeds to S110, and in S110, the vehicle collection/delivery determination portion 4022 determines that the package is deliverable to the vehicle. The processes from S102 to S111 are examples of a "determination process of determining whether the vehicle is suitable as the collection/delivery place of the first package or not," performed by a "controlling portion."

In S112, the vehicle collection/delivery determination portion 4022 outputs a determination result. For example, the vehicle collection/delivery determination portion 4022 transmits the determination result to the EC site server 600 or the collection/delivery management server 500 as a request source. After that, the process illustrated in FIG. 8 is ended. The process of S112 is an example of a process of an "output portion" "outputting a result of the determination process."

Figure 9:
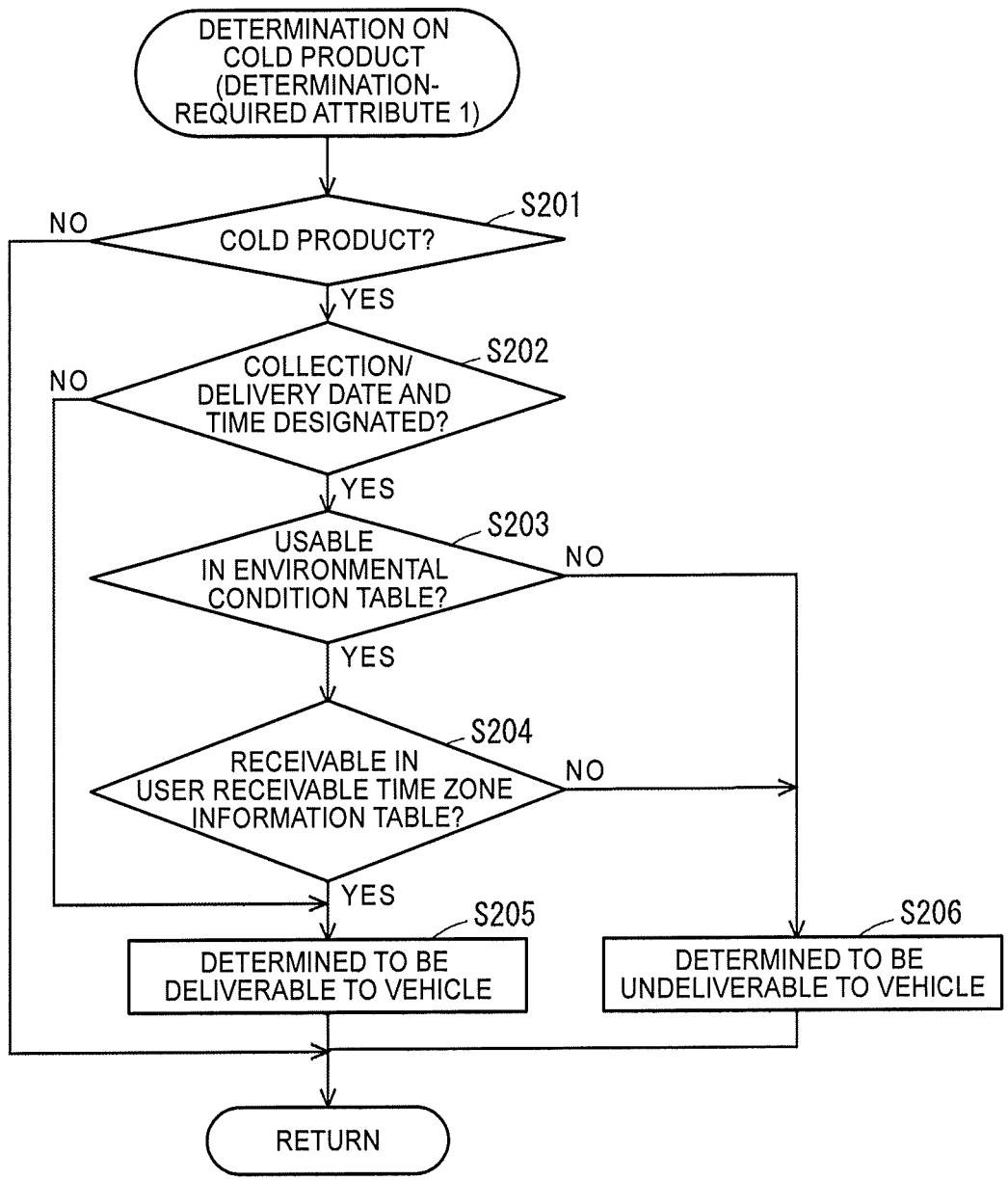
FIG. 9 is an example of a flowchart of a determination-required attribute determination process performed in the center server in a case where a package has information indicative of a cold product as attribute information.

FIG. 9 is an example of a flowchart of a determination-required attribute determination process performed in the center server 400 in a case where the package has information indicative of a cold product as attribute information. The process illustrated in FIG. 9 corresponds to the determination process on the determination-required attribute 1 in S106 in FIG. 8, for example.

In S201, the vehicle collection/delivery determination portion 4022 determines whether or not the attribute information of the target package requested to be subjected to the vehicle collection/delivery determination process includes information indicative of a cold product. When an affirmative determination is made in S201, the process proceeds to S202, and when a negative determination is made in S201, the process illustrated in FIG. 9 is ended.

In S202, the vehicle collection/delivery determination portion 4022 determines whether or not collection/delivery date and time are designated for the target package. When an affirmative determination is made in S202, the process proceeds to S203. When a negative determination is made in S202, the process proceeds to S205, and in S205, the vehicle collection/delivery determination portion 4022 determines that the package is deliverable to the vehicle. That is, in the example illustrated in FIG. 9, in terms of a package that is a cold product without designated collection/delivery date and time, it can be uniformly determined that the vehicle 10 is usable as the collection/delivery place.

Note that, in this case, the collection/delivery management server 500 or the EC site server 600 is just notified that the vehicle 10 is suitable as the collection/delivery place of the package that is a cold product. In this case, the collection/delivery date and time are not designated, and therefore, whether collection/delivery to the vehicle 10 is performed or not is determined by the collection/delivery management server 500 or the client user, for example, such that a time zone and the like suitable to collect/deliver a cold product are selected by the collection/delivery management server 500 to form a collection/delivery schedule, or after the collection/delivery schedule is formed, a request of a vehicle collection/delivery determination on the collection/delivery schedule is transmitted again, so that a collection/delivery determination is performed.

Note that, in terms of the package that is a cold product without designated collection/delivery date and time, it may be uniformly determined that the vehicle 10 is not usable as the collection/delivery place.

In S203, the vehicle collection/delivery determination portion 4022 determines whether or not a season and a time zone specified in the designated collection/delivery date and time of the target package correspond to "USABLE" in the environmental condition table. When an affirmative determination is made in S203, the process proceeds to S204. When a negative determination is made in S203, the process proceeds to S206, and in S206, the vehicle collection/delivery determination portion 4022 determines that the package is undeliverable to the vehicle. After that, the process illustrated in FIG. 9 is ended.

In S204, the vehicle collection/delivery determination portion 4022 determines whether or not the day and the time zone specified in the designated collection/delivery date and time of the target package correspond to "RECEIVABLE" in the user receivable time zone information table. Note that, when no information is registered in the user receivable time zone information table, a negative determination may be made in S204 or an inquiry may be made to the client user via the user terminal 50. When an affirmative determination is made in S204, the process proceeds to S205, and in S205, the vehicle collection/delivery determination portion 4022 determines that the package is deliverable to the vehicle. When a negative determination is made in S204, the process proceeds to S206, and in S206, the vehicle collection/delivery determination portion 4022 determines that the package is undeliverable to the vehicle. After the processes of S205 and S206 are performed, the process illustrated in FIG. 9 is ended.

In the example illustrated in FIG. 9, the processes of S203 and S204 may be performed in any order. Further, both processes may not necessarily be performed and either of the processes may be performed. Further, in the example illustrated in FIG. 9, before the process of S203 is performed, the user terminal 50 of the client user may be inquired about the position (inside or outside, with roof or without roof, and the like) of the vehicle 10.

Figure 10:
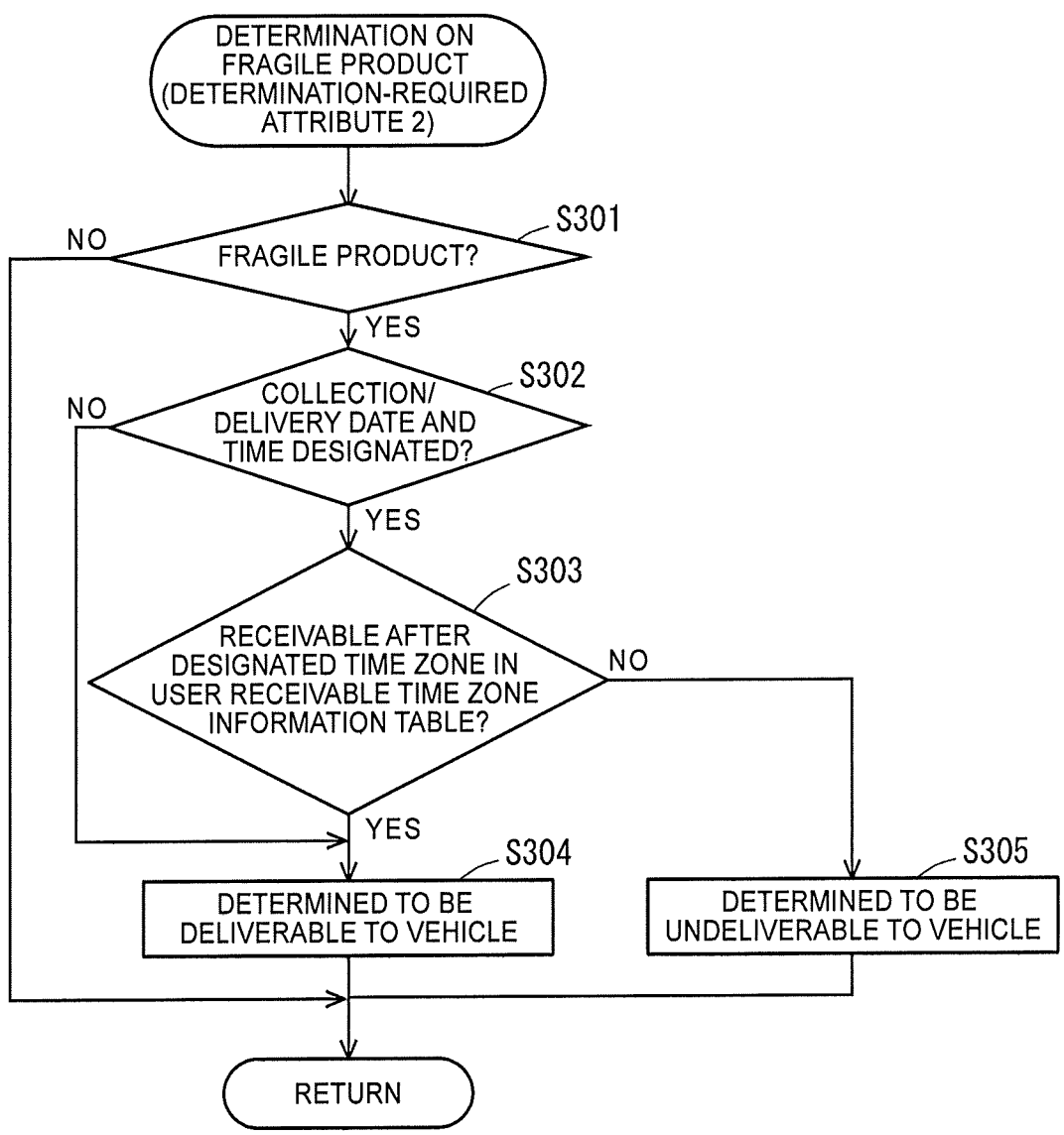
FIG. 10 is an example of a flowchart of a determination-required attribute determination process performed in the center server in a case where a package has information indicative of a fragile product as attribute information.

FIG. 10 is an example of a flowchart of a determination-required attribute determination process performed in the center server 400 in a case where the package has information indicative of a fragile product as attribute information. The process illustrated in FIG. 10 corresponds to the determination process on the determination-required attribute 2 in S107 in FIG. 8, for example.

In S301, the vehicle collection/delivery determination portion 4022 determines whether or not the target package requested to be subjected to the vehicle collection/delivery determination process has information indicative of a fragile product as attribute information. When an affirmative determination is made in S301, the process proceeds to S302, and when a negative determination is made in S301, the process illustrated in FIG. 10 is ended.

In S302, the vehicle collection/delivery determination portion 4022 determines whether or not collection/delivery date and time are designated for the target package. When an affirmative determination is made in S302, the process proceeds to S303. When a negative determination is made in S302, the process proceeds to S304, and in S304, the vehicle collection/delivery determination portion 4022 determines that the package is deliverable to the vehicle. That is, in the example illustrated in FIG. 10, in terms of a package that is a fragile product without designated collection/delivery date and time, it is uniformly determined that the vehicle 10 is usable as the collection/delivery place. In this case, how to deal with the package in terms of collection/delivery is entrusted to the collection/delivery management server 500 or the client user. Alternatively, in terms of the package that is a fragile product without designated collection/delivery date and time, it may be uniformly determined that the vehicle 10 is not usable as the collection/delivery place.

In S303, the vehicle collection/delivery determination portion 4022 determines whether or not time zones after a designated time zone in a day specified in the designated collection/delivery date and time of the target package correspond to "RECEIVABLE" in the user receivable time zone information table. The process of S303 is a process of checking that the vehicle 10 does not move after the target package is delivered to the vehicle 10. This is because, in a case where the target package is designated as a fragile product, the target package might be damaged by movement of the vehicle 10. Note that, when no information is registered in the user receivable time zone information table, a negative determination may be made in S303 or an inquiry may be made to the client user via the user terminal 50.

When an affirmative determination is made in S303, the process proceeds to S304, and in S304, the vehicle collection/delivery determination portion 4022 determines that the package is deliverable to the vehicle. When a negative determination is made in S303, the process proceeds to S305, and in S305, the vehicle collection/delivery determination portion 4022 determines that the package is undeliverable to the vehicle. After the processes of S304 and S305 are performed, the process illustrated in FIG. 10 is ended.

Figure 11:
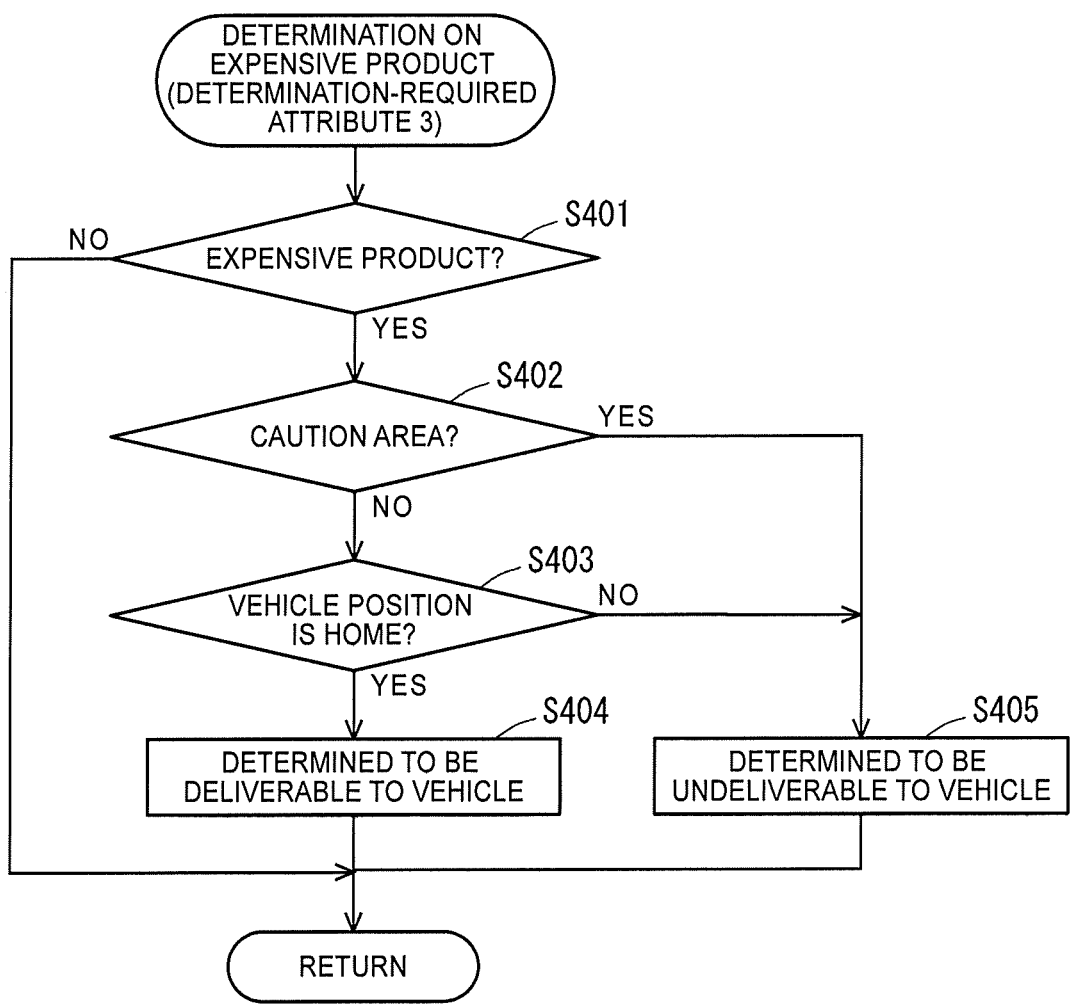
FIG. 11 is an example of a flowchart of a determination-required attribute determination process performed in the center server in a case where a package has information indicative of an expensive product as attribute information.

FIG. 11 is an example of a flowchart of a determination-required attribute determination process performed in the center server 400 in a case where the package has information indicative of an expensive product as attribute information. The process illustrated in FIG. 11 corresponds to the determination process on the determination-required attribute 3 in S108 in FIG. 8, for example.

In S401, the vehicle collection/delivery determination portion 4022 determines whether or not the target package requested to be subjected to the vehicle collection/delivery determination process has information indicative of an expensive product as attribute information. When an affirmative determination is made in S401, the process proceeds to S402, and when a negative determination is made in S401, the process illustrated in FIG. 11 is ended.

In S402, the vehicle collection/delivery determination portion 4022 determines whether or not an area where the vehicle 10 is located is a caution area. The caution area is, for example, an area where car break-in occurs frequently. The list of caution areas is registered in the vehicle collection/delivery condition information DB 405 in advance, for example. The area where the vehicle 10 is located is found, for example, such that a value of the vehicle position field is acquired from the vehicle location information table and an address corresponding to the value of the vehicle position field is acquired. Note that, in a case where no information is registered in the vehicle position field in the vehicle location information table, the client user may be inquired about the position of the vehicle 10 via the user terminal 50. The list of caution areas is one example of "area condition information."

When an affirmative determination is made in S402, the process proceeds to S405, and in S405, the vehicle collection/delivery determination portion 4022 determines that the package is undeliverable to the vehicle. After that, the process illustrated in FIG. 11 is ended. When a negative determination is made in S402, the process proceeds to S403.

In S403, the vehicle collection/delivery determination portion 4022 determines whether or not the position of the vehicle 10 is a home of the client user. The position of the vehicle 10 is acquired from the vehicle location information table, for example. Note that, in a case where no information is registered in the vehicle position field in the vehicle location information table, the client user may be inquired about the position of the vehicle 10 via the user terminal 50. When an affirmative determination is made in S403, the process proceeds to S404, and in S404, the vehicle collection/delivery determination portion 4022 determines that the package is deliverable to the vehicle. That is, in the example illustrated in FIG. 11, in terms of a package that has information indicative of an expensive product as attribute information, when the vehicle 10 is not present in a caution area and is parked at home, the vehicle 10 is usable as the collection/delivery place. This is because, when the vehicle 10 is parked at home, the client user or the recipient of the package is more likely to easily access the vehicle 10, so a period of time during which the package as an expensive product is left inside the vehicle 10 is more likely to be short or the package is less likely to be exposed to the eyes of a third party, and thus, it is considered that the package is less likely to be stolen. That the position of the vehicle 10 is the home of the client user is an example of "parking position condition information."

When a negative determination is made in S403, the process proceeds to S405, and in S405, the vehicle collection/delivery determination portion 4022 determines that the package is undeliverable to the vehicle. After that, the process illustrated in FIG. 11 is ended.

Note that, the process illustrated in FIG. 11 is an example, and even in a case where the position of the vehicle 10 is within a caution area, when the vehicle 10 is parked at home, it may be determined that the package is deliverable to the vehicle. Further, for example, a determination on whether or not the vehicle 10 is located inside or outside may be further performed, and when the vehicle 10 is not present in a caution area, parked at home, and placed inside, it may be determined that the vehicle 10 is usable as the collection/delivery place. Further, in the example illustrated in FIG. 11, for example, both processes of S402 and S403 may not necessarily be performed, and either of the processes may be performed.

Further, in the first embodiment, in a case where the package has information indicative of an expensive product as attribute information, the process illustrated in FIG. 11 is performed. However, in a case where the vehicle 10 is a delivery destination, a package having any attribute has a possibility that the package is stolen, so the determination process in FIG. 11 may be performed regardless of the attribute of the package.

Figure 12:
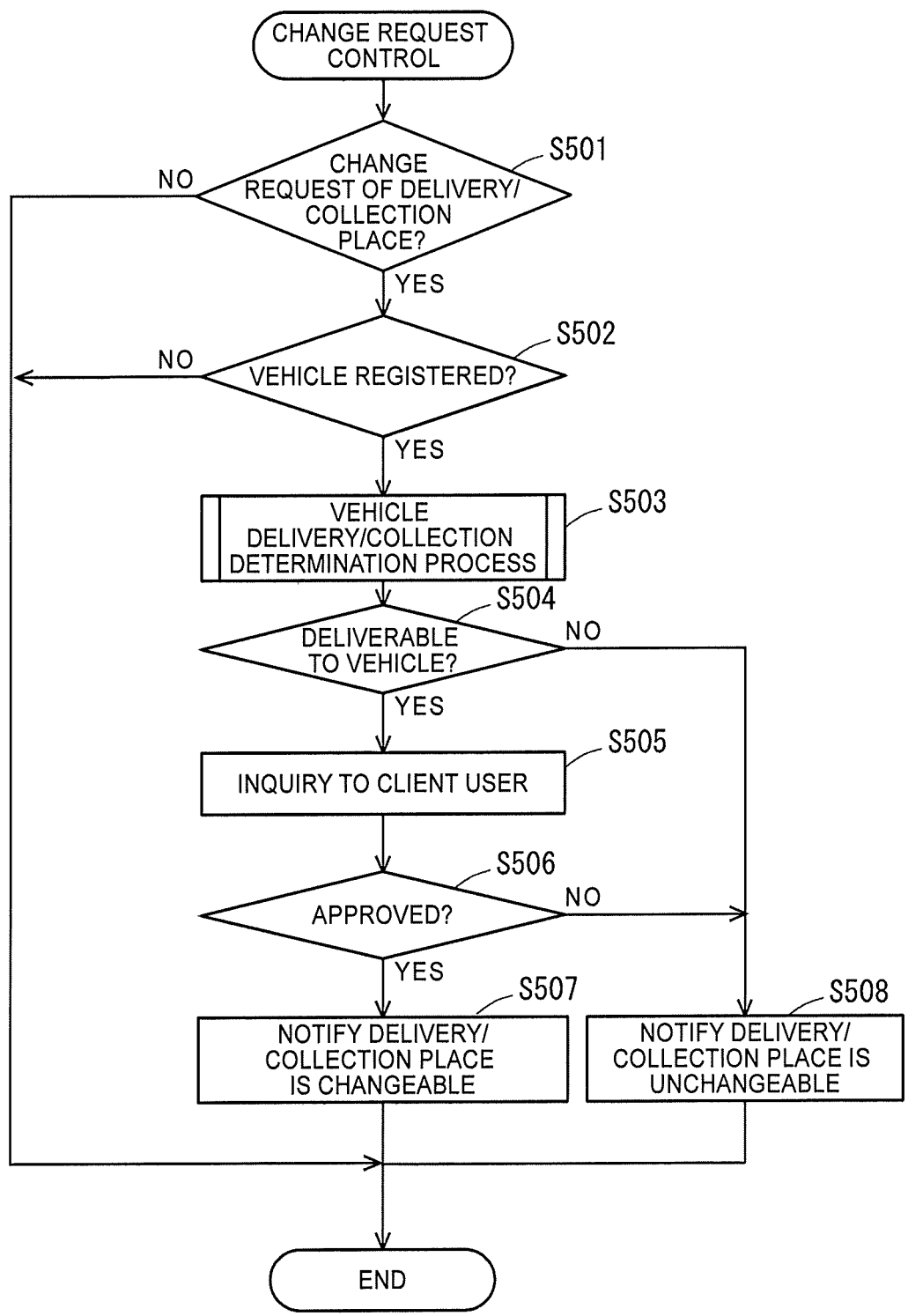
FIG. 12 is an example of a flowchart of a change request control process performed in the center server.

FIG. 12 is an example of a flowchart of a change request control process performed in the center server 400. The change request control process is a process performed when a change request of the collection/delivery place to the vehicle 10 is received from the user terminal 200 of the collection/delivery user via the collection/delivery management server 500. For example, when the collection/delivery user visits the home, of the client user, designated as the collection/delivery place for delivery of the package, the client user is absent, but the vehicle 10 is parked, and when the collection/delivery user wants to change the collection/delivery place to the vehicle 10, a change request of the collection/delivery place is transmitted via the user terminal 200. The process illustrated in FIG. 12 is performed repeatedly at a predetermined cycle, for example.

In S501, the vehicle collection/delivery determination portion 4022 determines whether a change request of the collection/delivery place is received or not. When an affirmative determination is made in S501, the process proceeds to S502, and when a negative determination is made in S501, the process illustrated in FIG. 12 is ended.

In S502, the vehicle collection/delivery determination portion 4022 determines whether or not the vehicle 10 of the client user is registered in the vehicle location information table, for example. Identification information of the client user is acquired from collection/delivery information corresponding to the target package for the change request of the collection/delivery place, for example. The collection/delivery information corresponding to the target package for the change request of the collection/delivery place may be, for example, received from the user terminal 200 of the collection/delivery user together with the change request of the collection/delivery place. Alternatively, the vehicle collection/delivery determination portion 4022 may receive identification information of a corresponding package from the user terminal 200 of the collection/delivery user together with the change request of the collection/delivery place and acquire, by inquiry, collection/delivery information corresponding to the identification information of the package from the collection/delivery management server 500. When an affirmative determination is made in S502, the process proceeds to S503, and when a negative determination is made in S502, the process illustrated in FIG. 12 is ended.

In S503, the vehicle collection/delivery determination portion 4022 performs a vehicle collection/delivery determination process on the target package. The vehicle collection/delivery determination process is just what is described in FIG. 8, for example. In S504, the vehicle collection/delivery determination portion 4022 determines whether or not a result of the vehicle collection/delivery determination process in S503 indicates that the package is deliverable to the vehicle. When an affirmative determination is made in S504, the process proceeds to S505. When a negative determination is made in S504, the process proceeds to S508, and in S508, the vehicle collection/delivery determination portion 4022 determines that the change is not performable, and transmits, to the user terminal 200 of the collection/delivery user via the collection/delivery management server 500, a notification that the change is not performable. After that, the process illustrated in FIG. 12 is ended.

In S505, the vehicle collection/delivery determination portion 4022 inquires of the user terminal 50 of the client user corresponding to the target package about a permission of the change of the collection/delivery place to the vehicle 10. In S506, the vehicle collection/delivery determination portion 4022 determines whether or not a response from the user terminal 50 of the client user is a permission response. When an affirmative determination is made in S506, the process proceeds to S507, and in S507, the vehicle collection/delivery determination portion 4022 determines that the change is performable, and transmits, to the user terminal 200 of the collection/delivery user via the collection/delivery management server 500, a notification that the change is performable. After that, the process illustrated in FIG. 12 is ended.

When a negative determination is made in S506, that is, when a rejection response is received from the user terminal 50 of the client user, the process proceeds to S508, and in S508, the vehicle collection/delivery determination portion 4022 determines that the change is not performable, and transmits, to the user terminal 200 of the collection/delivery user via the collection/delivery management server 500, a notification that the change is not performable. After that, the process illustrated in FIG. 12 is ended.

Note that the processes illustrated in FIG. 12, except the vehicle collection/delivery determination process, may be performed by the collection/delivery management server 500. In this case, when the collection/delivery management server 500 receives a change request of the collection/delivery place from the user terminal 200 of the collection/delivery user, the collection/delivery management server 500 transmits a request of the vehicle collection/delivery determination to the center server 400 instead of the processes of S502 and S503 and acquires the result of the vehicle collection/delivery determination.

Figure 13:
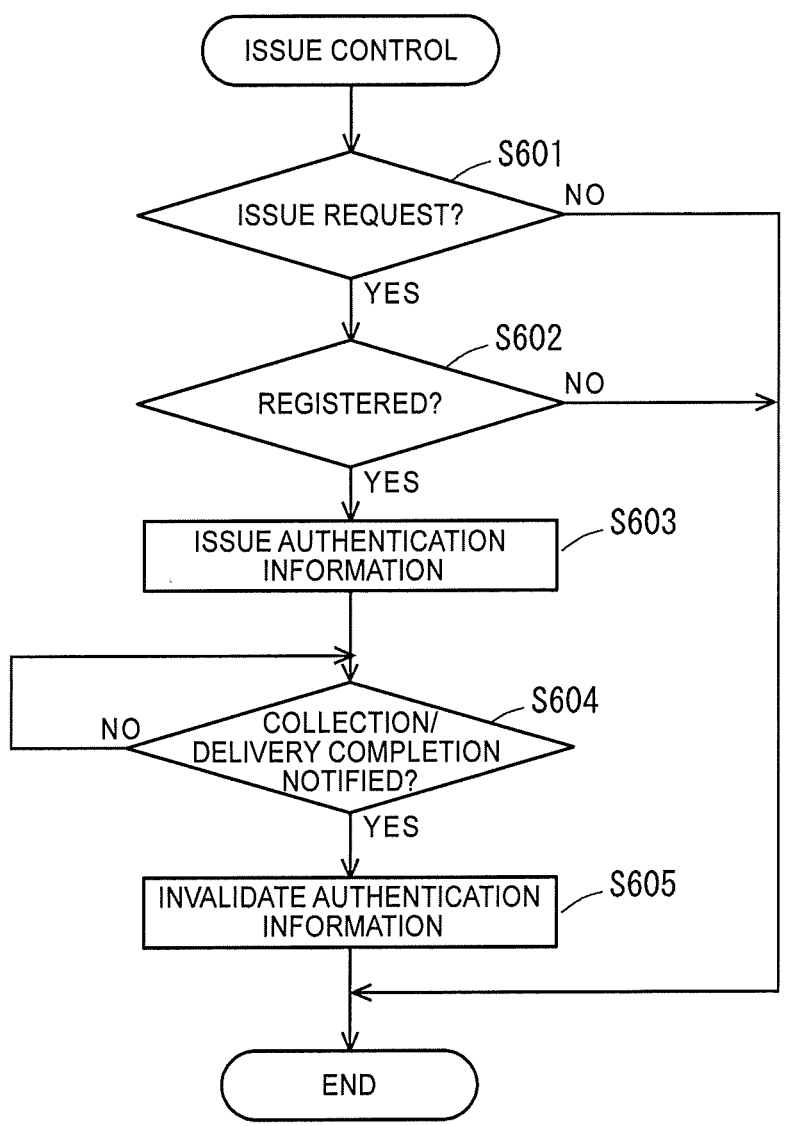
FIG. 13 is an example of a flowchart of an authentication information issue control process performed in the center server.

FIG. 13 is an example of a flowchart of an authentication information issue control process performed in the center server 400. The process illustrated in FIG. 13 is performed repeatedly at a predetermined cycle, for example.

In S601, the authentication information managing portion 4021 determines whether an issue request of authentication information is received or not. The issue request of the authentication information is received from the user terminal 200 of the collection/delivery user via the collection/delivery management server 500, for example. Identification information of the client user, identification information of the package, and the like are also received together with the issue request of the authentication information. When an affirmative determination is made in S601, the process proceeds to S602. When a negative determination is made in S601, the process illustrated in FIG. 13 is ended.

In S602, the authentication information managing portion 4021 determines whether or not collection/delivery information corresponding to the target package for the issue request of the authentication information is registered. In a case where the collection/delivery place is the vehicle 10, for example, the collection/delivery information targeted for the issue of the authentication information is transmitted to the center server 400 from the collection/delivery management server 500 and registered in the center server 400. When an affirmative determination is made in S602, the process proceeds to S603, and when a negative determination is made in S602, the process illustrated in FIG. 13 is ended.

In S603, the authentication information managing portion 4021 issues authentication information of the vehicle 10 to the user terminal 200 of the collection/delivery user as a request source. The authentication information of the vehicle 10 is acquired from the authentication information DB 404. The authentication information of the vehicle 10 is transmitted to the user terminal 200 of the collection/delivery user via the collection/delivery management server 500.

In S604, the authentication information managing portion 4021 determines whether a collection/delivery completion notification is received or not. The collection/delivery completion notification is transmitted from the user terminal 200 via the collection/delivery management server 500 when the collection/delivery user inputs collection/delivery completion into the user terminal 200, for example. The identification information of the client user and the identification information of the package are also received together with the collection/delivery completion notification, for example. When an affirmative determination is made in S604, the process proceeds to S605 When a negative determination is made in S604, the process proceeds to S604 again. In a case where reception of the collection/delivery completion notification is not detected even after a predetermined time has elapsed, for example, the process may proceed to S605.

In S605, the authentication information managing portion 4021 performs an invalidation process of the authentication information. A content of the invalidation process of the authentication information is not limited particularly, provided that the collection/delivery user cannot lock and unlock the vehicle 10 by the authentication information that has been issued, but examples of the invalidation process are as follows. (1) The center server 400 orders the user terminal 200 to delete the authentication information. (2) The center server 400 orders the user terminal 200 to raise an invalidation flag of the authentication information. In this case, it is necessary for the controlling portion 203 to be configured not to transmit, to the vehicle 10, the authentication information to which the invalidation flag is raised, via short-distance wireless communication. (3) The center server 400 orders the user terminal 200 to rewrite an expiry date included in the authentication information to a past date. (4) The center server 400 orders the user terminal 200 to recognize that the authentication information is invalid, and not to transmit the authentication information to the vehicle 10. (5) The center server 400 orders the key unit 100 not to receive the authentication information from the user terminal 200.

The invalidation processes of (1) to (4) are a process performed by the center server 400 on the user terminal 200, and the invalidation process of (5) is a process performed by the center server 400 on the key unit 100. The invalidation process may be either of the process performed on the user terminal 200 and the process performed on the key unit 100, or both processes may be performed because the communication between the user terminal 200 and the center server 400 may not be always in a good state.

Note that, when the invalidation process is performed in S605, a notification that the authentication information is invalidated may be transmitted to the user terminal 200 to which the authentication information is invalidated. After that, the process illustrated in FIG. 13 is ended.

Note that the flowcharts illustrated in FIGS. 8 to 13 are all examples and are not limited to the processes illustrated herein.

Concrete Example

Figure 14:
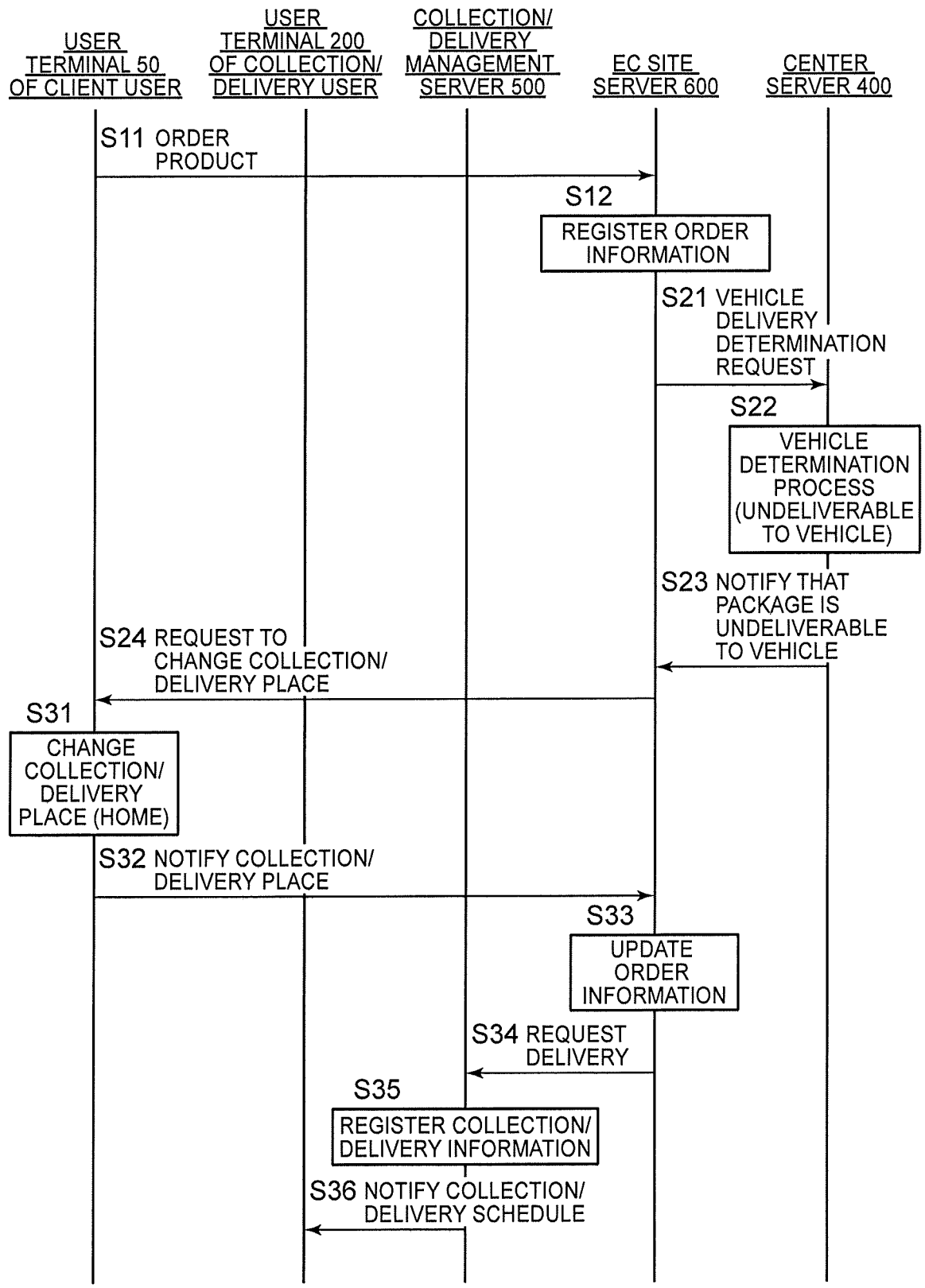
FIG. 14 is a view illustrating an example of a processing sequence in a concrete example.

FIG. 14 is a view illustrating an example of a processing sequence in a concrete example. With reference to FIG. 14, the following describes an example in which the client user orders a product on an EC site provided by the EC site server 600, and when the vehicle 10 is designated as a collection/delivery place for the product, the vehicle collection/delivery determination process is performed.

In S11, the client user orders a product from the user terminal 50. The client user selects the vehicle 10 as a collection/delivery place for the product, and the EC site server 600 receives the order of the product and is notified that the vehicle 10 is selected as the collection/delivery place. Note that, in a case where the client user has a request about collection/delivery date and time, a payment method for the product, and the like, those pieces of information are also notified to the EC site server 600 together with the order of the product. In the example illustrated in FIG. 14, the client user designates the collection/delivery place (the vehicle 10) and the collection/delivery date and time. Further, it is assumed that the collection/delivery date and time designated by the client user corresponds to summer.

In S12, the EC site server 600 receives the order of the product from the user terminal 50 of the client user, forms order information, and registers the order information in the order information table (FIG. 3). At this time, the EC site server 600 acquires attribute information of the ordered product and registers it in the order information table. In FIG. 14, an attribute as a cold product is included as one of attributes of the ordered product.

In S21, since the vehicle 10 is selected as the collection/delivery place for the product ordered from the client user, the EC site server 600 transmits a request of the vehicle collection/delivery determination to the center server 400. The order information of the ordered product is also transmitted to the center server 400 together with the request of the vehicle collection/delivery determination.

In S22, the center server 400 receives the request of the vehicle collection/delivery determination from the EC site server 600 (FIG. 8, S101: YES) and performs the vehicle collection/delivery determination process. In the example illustrated in FIG. 14, the package has information indicative of a cold product as attribute information (FIG. 8, S106, FIG. 9) and the season of the collection/delivery date and time designated by the client user is summer (FIG. 9, S203: NO). Hereby, the center server 400 determines that the vehicle 10 is not usable as the collection/delivery place for the ordered product (the package is undeliverable to the vehicle) (FIG. 9, S206, FIG. 8, S109: YES, S111).

In S23, the center server 400 notifies the EC site server 600 that the vehicle 10 is not usable as the collection/delivery place, as a determination result of the vehicle collection/delivery determination process (FIG. 8, S112). In S24, in order to inquire of the client user about a change of the collection/delivery place, the EC site server 600 transmits a change request of the collection/delivery place to the user terminal 50 of the client user.

In S31, the client user receives the change request of the collection/delivery place from the EC site server 600 via the user terminal 50 and performs, on the user terminal 50, an operation to change the collection/delivery place to home. In S32, the user terminal 50 of the client user transmits, to the EC site server 600, a notification that home is selected as the collection/delivery place, as a response to the change request of the collection/delivery place.

In S33, the EC site server 600 receives, from the user terminal 50 of the client user, the notification that home is selected as the collection/delivery place, and updates the order information. Hereby, the order from the client user is confirmed. In S34, the EC site server 600 transmits a delivery request of the ordered product to the collection/delivery management server 500. The order information of the product is also transmitted to the collection/delivery management server 500 together with the delivery request.

In S35, upon receipt of the delivery request from the EC site server 600, the collection/delivery management server 500 generates collection/delivery information based on the order information of the product (package) received from the EC site server 600 and registers it in the collection/delivery management DB 503. In S36, the collection/delivery management server 500 notifies a collection/delivery schedule to the user terminal 200 of the collection/delivery user. The collection/delivery information of the package, the home address of the client user, and the like are notified to the user terminal 200 of the collection/delivery user together with the collection/delivery schedule.

Figure 15:
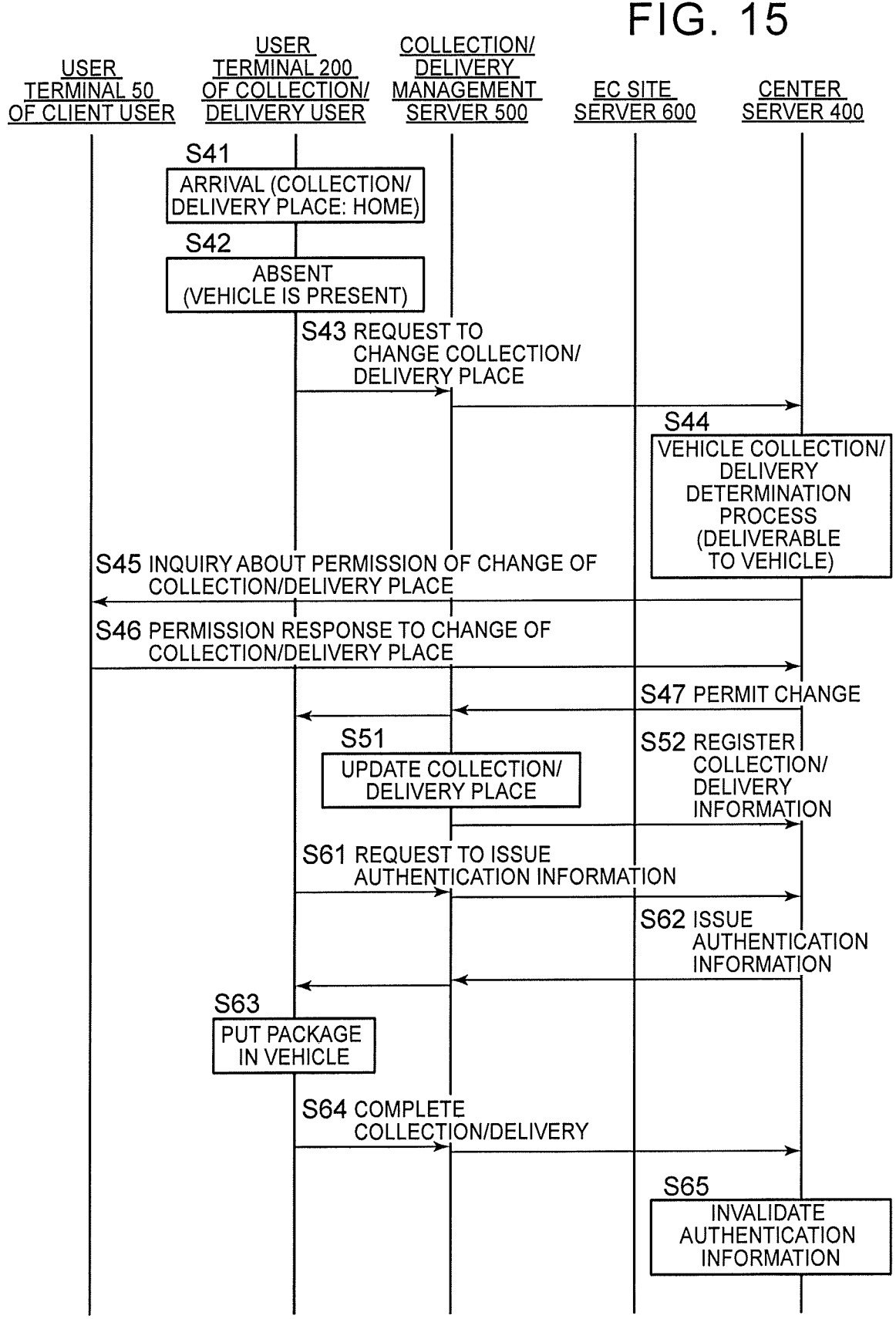
FIG. 15 is a view illustrating an example of a processing sequence in a concrete example.

FIG. 15 is a view illustrating an example of a processing sequence in a concrete example. In the example in FIG. 15, the client user is a recipient of a target package for collection/delivery. With reference to FIG. 15, the following describes an example in which a collection/delivery determination process is performed in a case where the client user is not present in the home, of the client user, designated as the collection/delivery place and the collection/delivery user requests to change the collection/delivery place to the vehicle 10. In FIG. 15, the target package for collection/delivery does not have an attribute for which the vehicle 10 is not usable as the collection/delivery place (for example, see FIG. 6), and collection/delivery date and time are not designated for the target package.

In S41, the collection/delivery user arrives at the home of the client user as the collection/delivery place. In S42, the client user is not at home, but the vehicle 10 is parked at home, so that the collection/delivery user wants to change the collection/delivery place to the vehicle 10 and inputs a change request of the collection/delivery place into the user terminal 200. In S43, the user terminal 200 of the collection/delivery user transmits the change request of the collection/delivery place to the collection/delivery management server 500. Since the change request of the collection/delivery place from the user terminal 200 of the collection/delivery user requests to change the collection/delivery place to the vehicle 10, the collection/delivery management server 500 transmits the change request of the collection/delivery place to the center server 400.

In S44, the center server 400 receives the change request of the collection/delivery place to the vehicle 10, from the user terminal 200 of the collection/delivery user via the collection/delivery management server 500 (FIG. 12, S501: YES), and performs the vehicle collection/delivery determination process (FIG. 12, S503). In FIG. 15, since the target package for collection/delivery does not have attribute information for which it is determined that the vehicle 10 is not suitable as the collection/delivery place (FIG. 8, S103: NO) and the collection/delivery date and time are not designated (FIG. 8, S104: NO), it is determined that the vehicle 10 is usable as the collection/delivery place (FIG. 8, S110, FIG. 12, S504: YES). Note that the collection/delivery information including the attribute information of the target package for collection/delivery, and the like may be transmitted to the center server 400 together with the change request of the collection/delivery place, or the center server 400 may acquire them by making an inquiry to the collection/delivery management server 500.

In S45, the center server 400 inquires of the user terminal 50 of the client user about a permission of the change of the collection/delivery place to the vehicle 10. In S46, the client user inputs, into the user terminal 50, a permission as a response to the inquiry about the permission of the change of the collection/delivery place to the vehicle 10, and the user terminal 50 transmits the permission response to the center server 400.

In S47, the center server 400 receives the permission response from the user terminal 50 of the client user (FIG. 12, S506: YES) and transmits, to the user terminal 200 of the collection/delivery user via the collection/delivery management server 500, a permission notification for the change of the collection/delivery place to the vehicle 10 (FIG. 12, S507).

In S51, upon receipt of the permission notification for the change of the collection/delivery place to the vehicle 10 from the center server 400, the collection/delivery management server 500 updates, to "vehicle," the collection/delivery place in the collection/delivery information corresponding to the target package for collection/delivery. In S52, since the collection/delivery place for the target package for collection/delivery is changed to the vehicle 10, the collection/delivery management server 500 transmits collection/delivery information corresponding to the package to the center server 400 and registers it therein. The center server 400 registers the collection/delivery information of the target package for collection/delivery as an issue target for authentication information.

In S61, the user terminal 200 of the collection/delivery user receives, from the center server 400, the permission notification for the change of the collection/delivery place to the vehicle 10, and transmits an issue request of authentication information of the vehicle 10 to the center server 400 via the collection/delivery management server 500. At this time, when the user terminal 200 of the collection/delivery user is not present within a distance where short-distance communication is performable from the vehicle 10, the user terminal 200 does not transmit the issue request of the authentication information, and when the distance from the vehicle 10 is less than the distance where short-distance communication is performable, the user terminal 200 transmits the issue request of the authentication information.

In S62, the center server 400 receives the issue request of the authentication information (FIG. 13, S601: YES) and issues the authentication information of the vehicle 10 to the user terminal 200 of the collection/delivery user via the collection/delivery management server 500 (FIG. 13, S602: YES, S603).

In S63, the collection/delivery user unlocks the door of the vehicle 10 by use of the authentication information issued from the center server 400 and puts the package in the vehicle cabin or the trunk of the vehicle 10. In S64, the collection/delivery user inputs collection/delivery completion into the user terminal 200, so that a collection/delivery completion notification is transmitted from the user terminal 200 to the center server 400 via the collection/delivery management server 500.

In S65, the center server 400 receives the collection/delivery completion notification from the user terminal 200 of the collection/delivery user via the collection/delivery management server 500 (FIG. 13, S604: YES), and performs the invalidation process of the authentication information (FIG. 13, S605). After that, the collection/delivery user cannot access the vehicle 10.

Effect of First Embodiment

In the first embodiment, it is determined whether or not the vehicle is suitable as the collection/delivery place for the package, based on attribute information of the package. This makes it possible to improve the efficiency of a collection/delivery operation of the package, including a designation operation of the collection/delivery place, in a case where the vehicle is selectable as the collection/delivery place for the package. For example, in a case where the package is a frozen product or a cold product, it is possible to restrain a decrease in quality of the package due to delivery. For example, in a case where the package requires ID confirmation, it is possible to avoid a recipient absence caused by delivery to the vehicle 10, thereby making it possible to restrain redelivery and the like.

Further, in the first embodiment, it is determined whether or not the vehicle is suitable as the collection/delivery place for the package, based on attribute information of the package and information on the surrounding environment around the vehicle. The information on the surrounding environment around the vehicle is a season, inside or outside, with roof or without roof, a temperature, and the like. The vehicle is movable and is placed inside or outside. Accordingly, in comparison with options as other collection/delivery places such as a home, a convenience store, and a locker, the surrounding environment around the vehicle largely changes and has a large influence. Accordingly, in consideration of the information on the surrounding environment around the vehicle in addition to the attribute information of the package, it is possible to determine whether or not the vehicle is suitable as the collection/delivery place for the package, so that the influence of the surrounding environment on the package becomes small.

Further, in the first embodiment, it is determined whether or not the vehicle is suitable as the collection/delivery place for the package, based on attribute information of the package and user receivable time zone information of the client user. Hereby, it is possible to determine whether or not the vehicle is suitable as the collection/delivery place for the package, so that the package can be more surely collected from and delivered to the vehicle.

Further, in the first embodiment, in a case where the package is a cold product, it is determined whether or not the vehicle 10 is suitable as the collection/delivery place for the package, in consideration of a season, a time zone, a temperature, or the like. Further, in a case where the package is a cold product, whether or not the vehicle is suitable as the collection/delivery place for the package may be determined based on a degree of sunlight on the vehicle. With the configuration, it is possible to deliver the cold product to the vehicle 10 depending on the season, the time zone, the temperature, the degree of sunlight, and the like, thereby making it possible to improve a utilization ratio of the vehicle 10 as the collection/delivery place.

Further, in the first embodiment, when the package is very likely to be stolen, it is determined whether or not the vehicle 10 is suitable as the collection/delivery place for the package, based on the address of the vehicle. For example, whether or not the vehicle is suitable as the collection/delivery place for the package is determined based on whether or not the address of the position of the vehicle is within an area where car break-in and the like occur frequently, thereby making it possible to secure the security of the package.

Further, in the first embodiment, when the package is very likely to be stolen, it is determined whether or not the vehicle 10 is suitable as the collection/delivery place for the package, based on whether the position of the vehicle is a home of the recipient of the package or not. In a case where the vehicle is located in a garage at home or the like, the package is rarely exposed to the eyes of a third party, so the security is more likely to be secured. Accordingly, it is possible to improve the utilization ratio of the vehicle 10 as the collection/delivery place.

Further, in the first embodiment, attribute information for which it is determined that the vehicle 10 is suitable as the collection/delivery place, attribute information for which it is determined that the vehicle 10 is not suitable as the collection/delivery place, and attribute information for which a determination process is requested can be easily customized by editing the package attribute condition table in FIG. 6, for example. Further, in a case where attribute information for which a determination process is requested is further added newly, it is possible to handle the newly added attribute information without changing a main process as illustrated in FIG. 8, by adding a program module of the determination process corresponding to the attribute information such as the processes from FIG. 9 to FIG. 11.

Second Embodiment

Figure 16:
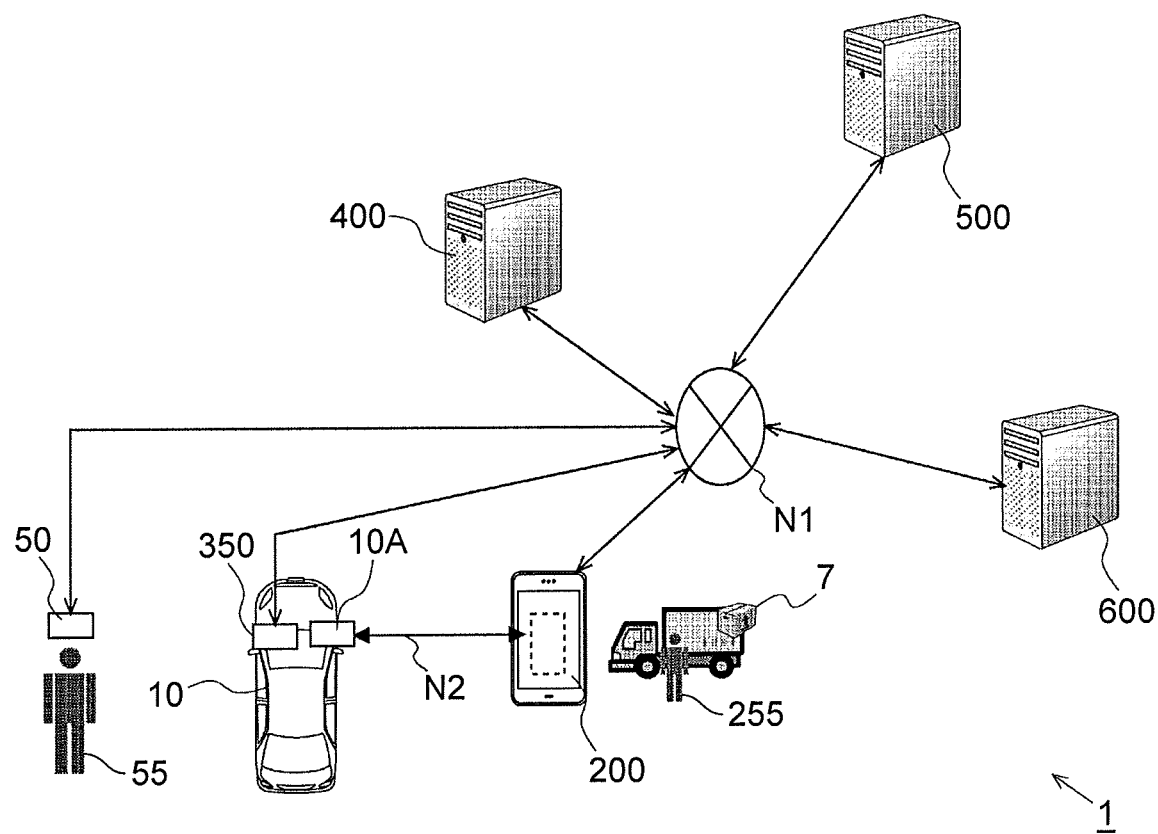
FIG. 16 is a view illustrating a schematic configuration of a trunk share system according to a second embodiment.

FIG. 16 is a view illustrating a schematic configuration of the trunk share system 1 according to the second embodiment. A difference between the trunk share system 1 illustrated in FIG. 1 and the trunk share system 1 illustrated in FIG. 16 is whether or not a data communication device 350 is included. A constituent substantially common between those trunk share systems has the same reference sign, and a detailed description thereof is omitted.

The data communication device 350 is a device provided in the vehicle 10 and is connected to the network N1 via wireless communication, for example. The data communication device 350 transmits positional information of the vehicle 10 to the center server 400 at a predetermined cycle, for example.

In the second embodiment, the center server 400 provides a service of delivery of a package in the vehicle 10 at a place of visit by use of positional information of the vehicle 10, transmitted from the data communication device 350, in addition to the service provided by the trunk share system 1 in the first embodiment, for example. More specifically, in the second embodiment, the center server 400 permits delivery to the vehicle 10 about a package having, as attribute information, information indicating that the package is required to be directly delivered to its recipient (ID confirmation required, freight collect, cash on delivery, and the like). The center server 400 monitors positional information between the vehicle 10 and the user terminal 200 of the collection/delivery user who delivers the package. When the vehicle 10 and the user terminal 200 come close to each other, the center server 400 notifies the user terminal 50 of the client user and the user terminal 200 of the collection/delivery user that they come close to each other, and the center server 400 guides them to meet each other.

Hereby, the client user can receive the package at a place of visit by the vehicle 10. Further, in a case where the vehicle 10 and the user terminal 200 of the collection/delivery user come close to each other, they are notified that they come close to each other. Accordingly, the client user may move by the vehicle 10 or the collection/delivery user may move by a collection/delivery vehicle, so that the client user can stop or park the vehicle 10 to further shorten the time to wait for arrival of the collection/delivery user. The positional information of the vehicle 10, transmitted from the data communication device 350, is an example of "positional information of the first vehicle." The positional information of the user terminal 200 of the collection/delivery user is an example of "positional information of a carrier."

Figure 17:
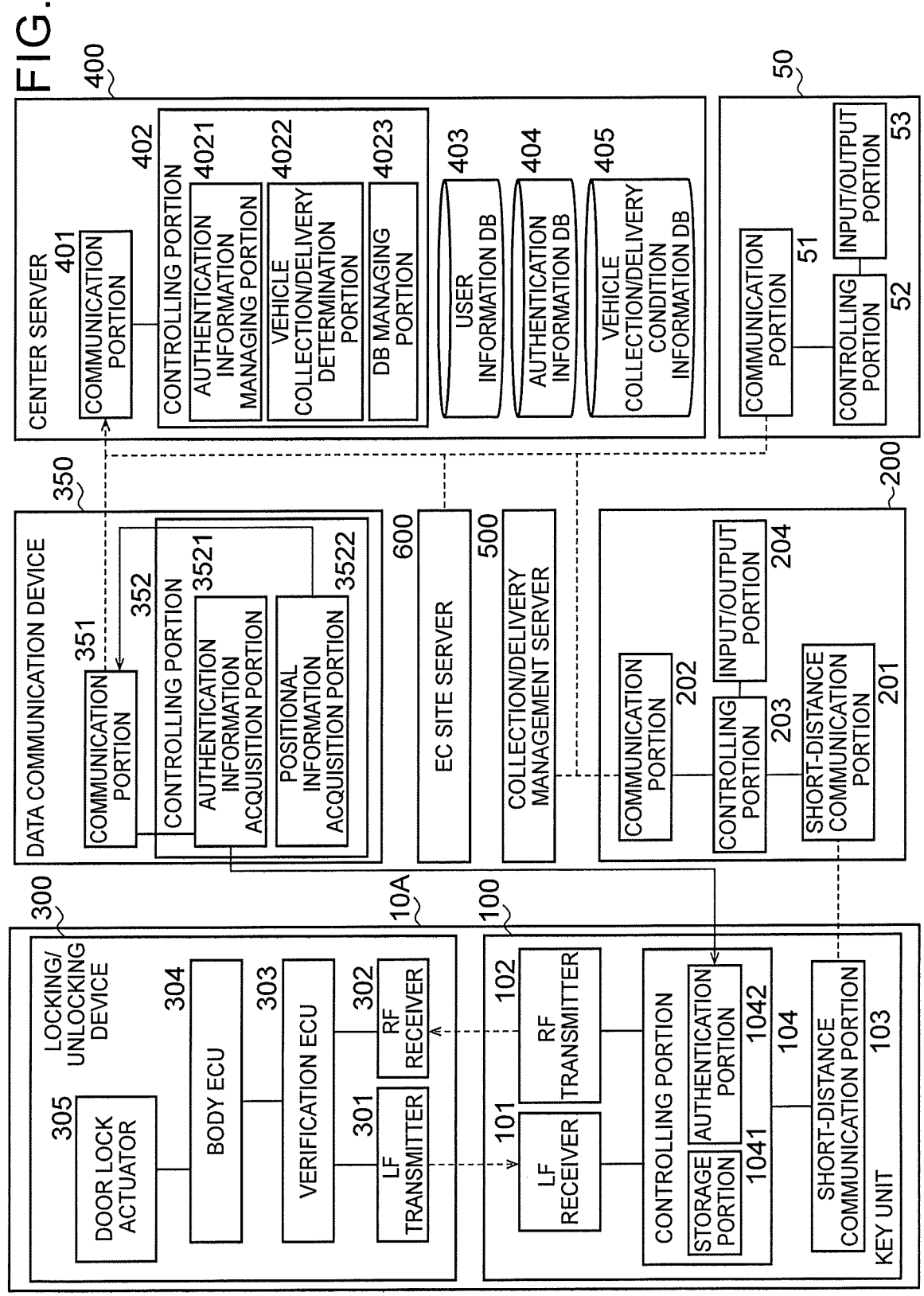
FIG. 17 is a block diagram schematically illustrating examples of constituents of the trunk share system according to the second embodiment.

FIG. 17 is a block diagram schematically illustrating examples of constituents of the trunk share system 1 according to the second embodiment. The data communication device 350 is a device provided in the vehicle 10 and has a configuration of a computer including a processor (not shown) such as a CPU or a DSP, a main storage portion (not shown) such as a RAM or a ROM, and an auxiliary storage portion (not shown) such as an EPROM, a hard disk drive, or a removable medium. Note that the removable medium is just what is described in the first embodiment. In the auxiliary storage portion, an operating system (OS), various programs, various tables, and the like are stored, and a program stored therein is loaded in a working area of the main storage portion and executed so that each constituent part and the like is controlled via the execution of the program, thereby making it possible to implement a function in line with a predetermined object.

Further, the data communication device 350 includes a communication portion 351. The communication portion 351 performs communication with the center server 400. The communication portion 351 is a radio communications circuit for wireless communication, for example. The radio communications circuit is connected to the network N1 such as the Internet that is a public communication network.

Further, in the data communication device 350, a controlling portion 352 as a function part is formed by execution of a program by the processor. The controlling portion 352 performs a transmission process of the positional information of the vehicle 10 and a supply process of information associated with an authentication process in the key unit 100 (hereinafter referred to as "authentication process associated information"), for example. More specifically, the controlling portion 352 includes an authentication information acquisition portion 3521 and a positional information acquisition portion 3522 as function parts.

The authentication information acquisition portion 3521 acquires, for example, authentication process associated information in the key unit 100 from the center server 400 via the communication portion 351 and supplies it to the controlling portion 104 of the key unit 100. Note that, in order to supply the authentication process associated information, the data communication device 350 and the key unit 100 are electrically connected to each other via CAN or the like. Further, the authentication information acquisition portion 3521 may acquire various pieces of information usable for the vehicle 10 from the center server 400 via the communication portion 351, as well as the authentication process associated information.

The positional information acquisition portion 3522 acquires, at a predetermined cycle, positional information on a current position of the vehicle 10 from a sensor such as a GPS receiver that can acquire the positional information and transmits it to the center server 400 via the communication portion 351. The GPS receiver may be provided in the data communication device 350 or a GPS receiver provided in a car navigation system or the like provided in the vehicle 10 and connected to the data communication device may be used. Furthermore, the positional information acquisition portion 3522 may acquire various pieces of information detected by other sensors and the like (not shown) in the vehicle 10 and may supply them to the center server 400 via the communication portion 351.

The positional information of the vehicle 10 transmitted from the positional information acquisition portion 3522 at a predetermined cycle is received by the DB managing portion 4023 via the communication portion 401 of the center server 400, for example. The DB managing portion 4023 updates the current position of the vehicle 10 in a vehicle management DB (not shown) by use of the positional information of the vehicle 10 received at a predetermined cycle, for example. The vehicle management DB is established such that a program of a database management system to be executed by a processor manages data to be stored in the auxiliary storage portion. The vehicle management DB is, for example, a relational database and information on the vehicle 10 is stored therein. The DB managing portion 4023 of the center server 400 is an example of a "receiving portion." Further, the vehicle collection/delivery determination portion 4022 of the center server 400 is an example of a "determination portion" and a "transmission portion."

FIG. 18 is an example of a package attribute condition table according to the second embodiment. The package attribute condition table illustrated in FIG. 18 is different from the package attribute condition table illustrated in FIG. 6 in that information indicating that direct delivery to a recipient is required, e.g., information indicating that ID confirmation is required, information indicative of freight collect, information indicative of cash on delivery, and the like, is set to "DETERMINATION REQUIRED." Hereby, in the second embodiment, in a case where the package has, as attribute information, the information indicating that direct delivery to the recipient is required, a determination-required attribute determination process is performed on the package (see FIG. 8).

Figure 19:
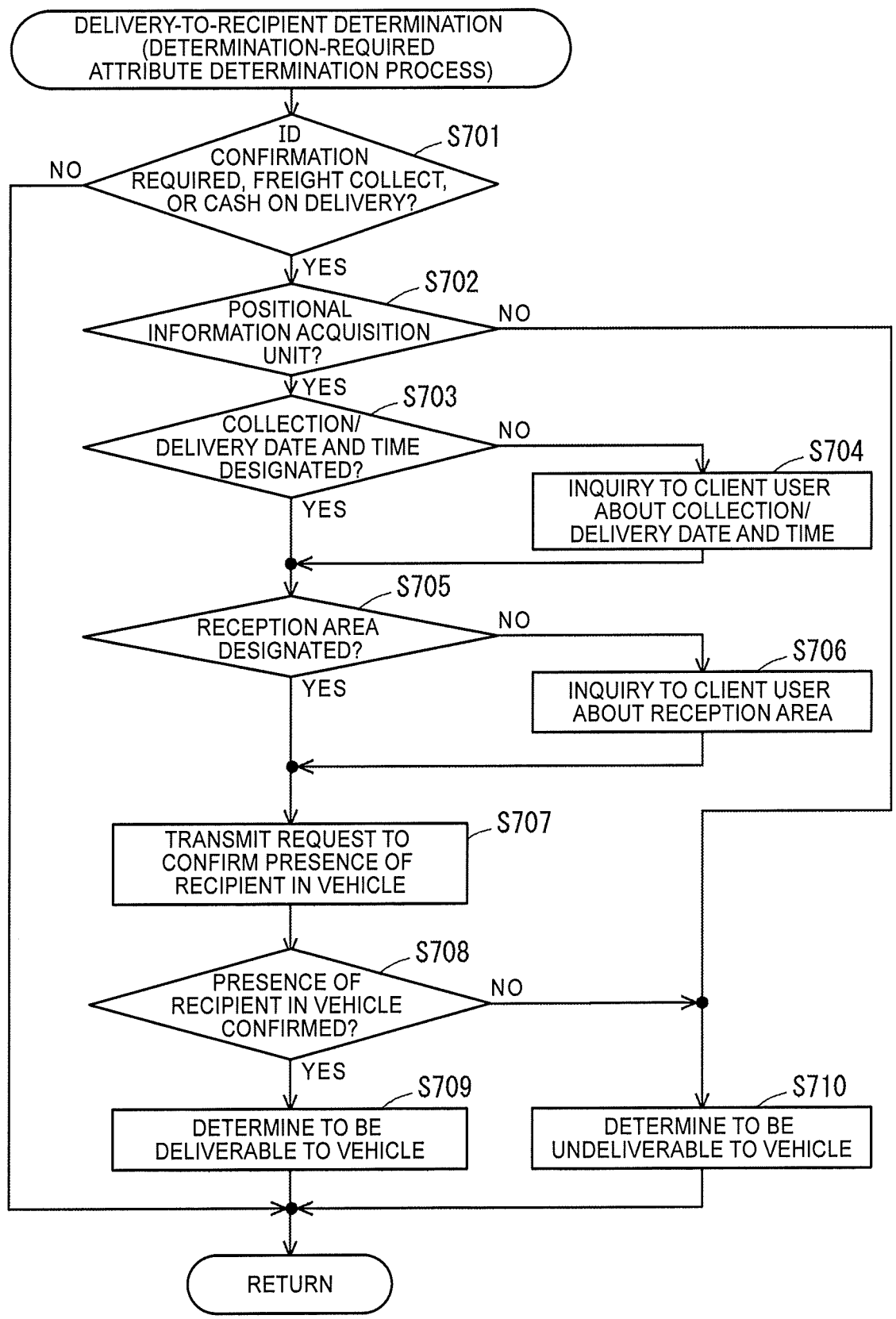
FIG. 19 is an example of a flowchart of a determination-required attribute determination process performed in a center server according to the second embodiment in a case where a package has, as attribute information, information indicating that direct delivery to a recipient is required.

FIG. 19 is an example of a flowchart of a determination-required attribute determination process performed in the center server 400 according to the second embodiment in a case where the package has, as attribute information, information indicating that direct delivery to the recipient is required. The process illustrated in FIG. 19 is performed as one of subroutines with the flowchart illustrated in FIG. 8 being taken as a main routine, and is performed as one of the determination processes on the determination-required attributes 1 to 3 from S106 to S108 illustrated in FIG. 8, or as a determination process on a determination-required attribute 4 in addition to the determination processes on the determination-required attributes 1 to 3 from S106 to S108 illustrated in FIG. 8.

In S701, the vehicle collection/delivery determination portion 4022 determines whether or not a target package requested to be subjected to the vehicle collection/delivery determination process has information indicating that direct delivery to the recipient is required, as attribute information. The information indicating that direct delivery to the recipient is required is, for example, information indicating that ID confirmation is required, information indicative of freight collect, or information indicative of cash on delivery. When an affirmative determination is made in S701, the process proceeds to S702, and when a negative determination is made in S701, the process illustrated in FIG. 19 is ended, so that the process returns to a subsequent process in FIG. 8.

In S702, the vehicle collection/delivery determination portion 4022 determines whether or not a positional information acquisition unit is provided in the vehicle 10 used as the collection/delivery place for the target package. The positional information acquisition unit in S702 indicates the data communication device 350 in the second embodiment. Note that the positional information acquisition unit provided in the vehicle 10 is not limited to the data communication device 350. Information on whether or not the positional information acquisition unit is provided in the vehicle 10 is held in the user information DB 403 or a vehicle DB (not shown), for example. When an affirmative determination is made in S702, the process proceeds to S703. When a negative determination is made in S702, the process proceeds to S710, and in S710, the vehicle collection/delivery determination portion 4022 determines that the package is undeliverable to the vehicle. After that, the process illustrated in FIG. 19 is ended, so that the process returns to a subsequent process in FIG. 8, for example.

In S703, the vehicle collection/delivery determination portion 4022 determines whether or not collection/delivery date and time are designated for the target package. When an affirmative determination is made in S703, the process proceeds to S705. When a negative determination is made in S703, the process proceeds to S704.

In S704, since the collection/delivery date and time are not designated for the target package, the vehicle collection/delivery determination portion 4022 inquires of the user terminal of the client user about collection/delivery date and time via the EC site server 600, so as to receive designated collection/delivery date and time.

In S705, the vehicle collection/delivery determination portion 4022 determines whether or not a reception area is designated for the target package. When an affirmative determination is made in S705, the process proceeds to S707. When a negative determination is made in S705, the process proceeds to S706.

In S706, since the reception area is not designated for the target package, the vehicle collection/delivery determination portion 4022 inquires of the user terminal of the client user about the reception area via the EC site server 600, for example, so as to receive a designated reception area. In a case of delivery of the package having attribute information indicating that direct delivery to the recipient is required with the vehicle 10 being designated as the collection/delivery place, the vehicle 10 may not stay at one place. Accordingly, when the collection/delivery date and time and the reception area are not determined, it is difficult to deliver the package. On this account, in the example illustrated in FIG. 19, it is checked whether or not the collection/delivery date and time and the reception area are designated by the client user, and when they are not designated, an inquiry is made. For example, the reception area is selected such that areas are set by use of setting of delivery areas and the like of the parcels delivery company in the collection/delivery management server 500, and the client user selects, from among the areas thus set, an expected area where the recipient and the vehicle 10 are located on the collection/delivery date and time.

In S707, the vehicle collection/delivery determination portion 4022 transmits, to the user terminal 50 of the client user via the EC site server 600, a notification for confirmation of the presence of the recipient inside the vehicle 10 in the reception area on the designated collection/delivery date and time, for example. In S708, the vehicle collection/delivery determination portion 4022 determines whether or not an OK response to the confirmation of the presence of the recipient inside the vehicle 10 is received from the user terminal 50 of the client user via the EC site server 600, for example. When an affirmative determination is made in S708, the process proceeds to S709, and when a negative determination is made in S708, the process proceeds to S710.

In S709, the vehicle collection/delivery determination portion 4022 determines that the package is deliverable to the vehicle. In S710, the vehicle collection/delivery determination portion 4022 determines that the package is undeliverable to the vehicle. After S709 and S710, the process illustrated in FIG. 19 is ended, so that the process returns to a subsequent process in FIG. 8, for example.

In the example illustrated in FIG. 19, in a case where the position acquisition unit is provided in the vehicle 10 as the collection/delivery place and it is confirmed by the client user that the recipient is present in the vehicle 10 on the collection/delivery date and time, it is determined that the package is deliverable to the vehicle. This is because the target package for collection/delivery has, as attribute information, information indicating that direct delivery to the recipient is required, e.g., information indicating that ID confirmation is required, information indicative of freight collect, information indicative of cash on delivery, or the like. Note that the determination-required attribute determination process, as illustrated in FIG. 19, about the package having, as attribute information, information indicating that direct delivery to the recipient is required is an example, and the determination-required attribute determination process is not limited to this. For example, instead of the processes of S703 and S704, in a case where the collection/delivery date and time are not designated, the collection/delivery management server 500 may be inquired about collection/delivery scheduled date and time for the target package, and the transmission, in S707, of the notification for confirmation of the presence of the recipient inside the vehicle 10 may be performed by use of the collection/delivery scheduled date and time.

Figure 20:
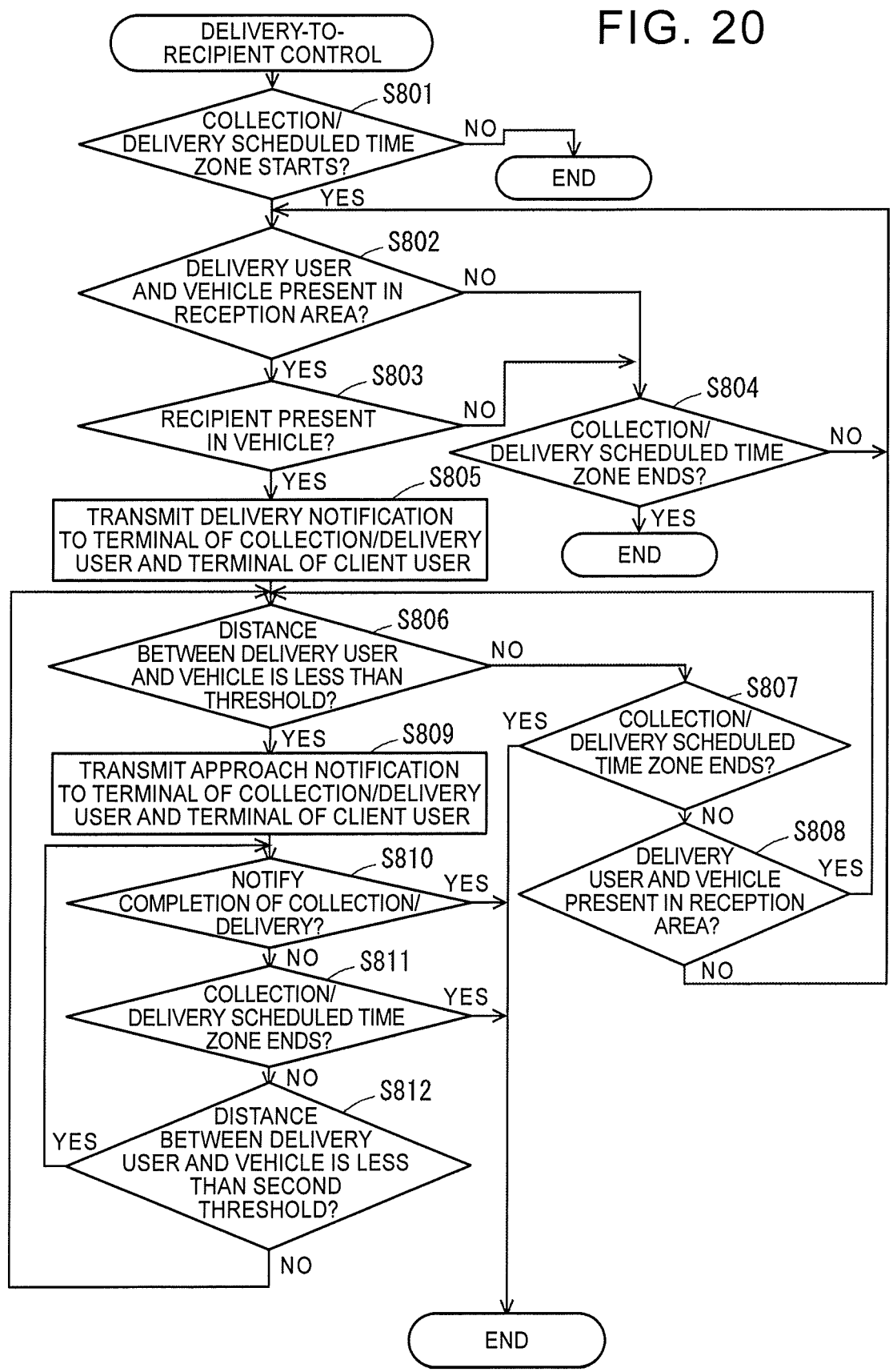
FIG. 20 is an example of a flowchart of a delivery-to-recipient control process in the center server.

FIG. 20 is an example of a flowchart of a delivery-to-recipient control process in the center server 400. The delivery-to-recipient control process is a process of causing the collection/delivery user to meet the vehicle 10 as the collection/delivery place in a collection/delivery time zone at the time of delivery of the package having attribute information indicating that direct delivery to the recipient is required. The process illustrated in FIG. 20 is performed repeatedly at a predetermined cycle, for example.

In S801, the vehicle collection/delivery determination portion 4022 determines whether or not a collection/delivery scheduled time zone for the target package is started. The target package in S801 is a package having, as attribute information, information indicating that direct delivery to the recipient is required. Information of the package having, as attribute information, the information indicating that direct delivery to the recipient is required and information on the collection/delivery scheduled time zone of the package are acquired from the collection/delivery management server 500 or the EC site server 600, for example, at the time of the vehicle collection/delivery determination process (e.g., FIG. 8) and stored in the storage portion. When an affirmative determination is made in S801, the process proceeds to S802. When a negative determination is made in S801, the process illustrated in FIG. 20 is ended.

In S802, the vehicle collection/delivery determination portion 4022 determines whether or not the user terminal 200 of the collection/delivery user and the vehicle 10 are present in the reception area. The determination in S802 is performed based on positional information transmitted from the user terminal 200 of the collection/delivery user via the collection/delivery management server 500 at a predetermined cycle and positional information transmitted from the data communication device 350 of the vehicle 10 at a predetermined cycle, for example. When an affirmative determination is made in S802, the process proceeds to S803, and when a negative determination is made in S802, the process proceeds to S804. A process of receiving the positional information transmitted from the data communication device 350 of the vehicle 10 at a predetermined cycle and the positional information transmitted from the user terminal 200 of the collection/delivery user via the collection/delivery management server 500 at a predetermined cycle is an example of a process of a "receiving portion" "receiving positional information of the first vehicle and positional information of the carrier of the first package."

In S803, the vehicle collection/delivery determination portion 4022 checks whether or not the recipient is present inside the vehicle 10. The center server 400 may acquire whether or not the recipient is present inside the vehicle 10 by inquiring of the user terminal 50 of the client user, for example, or the data communication device 350 provided in the vehicle 10 may acquire, by a motion detector, whether or not the recipient is present inside the vehicle 10 and transmit it to the center server 400, for example. When an affirmative determination is made in S803, the process proceeds to S805, and when a negative determination is made in S803, the process proceeds to S804.

S804 is a process to be performed when a negative determination is made in S802 or S803, that is, a process to be performed when either one of the user terminal 200 of the collection/delivery user and the vehicle 10 is not present in the reception area or when the recipient is not present inside the vehicle 10. In S804, the vehicle collection/delivery determination portion 4022 determines whether or not the collection/delivery scheduled time zone is finished. When an affirmative determination is made in S804, the process illustrated in FIG. 20 is ended. When a negative determination is made in S804, the process proceeds to S802.

In S805, the vehicle collection/delivery determination portion 4022 transmits, to the user terminal 200 of the collection/delivery user and the user terminal 50 of the client user, a delivery notification notifying that the user terminal 200 of the collection/delivery user and the vehicle 10 are present in the reception area and the package is deliverable. Note that the client user may not be the recipient inside the vehicle 10, but the notification is transmitted to the user terminal 50 of the client user as a responsible person for communication with the recipient. In a case where the client user and the recipient are different, contact information (a user terminal of the recipient, or the like) of the recipient may be acquired from the client user, so that the notification in S805 and the like may be transmitted to the user terminal of the recipient. This also applies to other notification processes in FIG. 20.

In S806, the vehicle collection/delivery determination portion 4022 determines whether or not a distance between the user terminal 200 of the collection/delivery user and the vehicle 10 is less than a predetermined threshold. The predetermined threshold is a distance within which the user terminal 200 of the collection/delivery user can meet the vehicle 10 in about one to five minutes and is, for example, from 500 m to 1 km. That is, in S806, it is determined whether or not the user terminal 200 of the collection/delivery user and the vehicle 10 come close to each other. When an affirmative determination is made in S806, the process proceeds to S809, and when a negative determination is made in S806, the process proceeds to S807.

S807 and S808 are a process to be performed when a negative determination is made in S806, that is, a process to be performed when the user terminal 200 of the collection/delivery user and the vehicle 10 are present in the reception area, but they are distanced from each other by the predetermined threshold or more. In S807, the vehicle collection/delivery determination portion 4022 determines whether or not the collection/delivery scheduled time zone is finished. When an affirmative determination is made in S807, the process illustrated in FIG. 20 is ended. When a negative determination is made in S807, the process proceeds to S808.

In S808, the vehicle collection/delivery determination portion 4022 determines whether or not the user terminal 200 of the collection/delivery user and the vehicle 10 are present in the reception area. When a negative determination is made in S808, the vehicle collection/delivery determination portion 4022 determines that the user terminal 200 of the collection/delivery user or the vehicle 10 goes out of the reception area so they are distanced from each other, and thus, the process proceeds to S802 again. When an affirmative determination is made in S808, the user terminal 200 of the collection/delivery user and the vehicle 10 are still present in the reception area, so the process proceeds to S806 again.

The processes after S809 are processes to be performed when an affirmative determination is made in S806, that is, processes to be performed when the distance between the user terminal 200 of the collection/delivery user and the vehicle 10 is less than the predetermined threshold. In S809, the vehicle collection/delivery determination portion 4022 transmits, to the user terminal 200 of the collection/delivery user and the user terminal 50 of the client user, an approach notification notifying that the user terminal 200 of the collection/delivery user and the vehicle 10 come close to each other. The approach notification allows the collection/delivery user and the client user (or the recipient) to recognize that they come close to each other, so as to promote them to meet each other.

In S810, the vehicle collection/delivery determination portion 4022 determines whether or not the collection/delivery user completes collection/delivery. That the collection/delivery user completes collection/delivery is detected, for example, such that the collection/delivery user inputs a collection/delivery completion notification into the user terminal 200, the user terminal 200 transmits the collection/delivery completion notification to the collection/delivery management server 500, and the collection/delivery completion notification of the collection/delivery user is transmitted from the collection/delivery management server 500 to the center server 400. When an affirmative determination is made in S810, the process illustrated in FIG. 20 is ended. When a negative determination is made in S810, the process proceeds to S811.

In S811, the vehicle collection/delivery determination portion 4022 determines whether or not the collection/delivery scheduled time zone is finished. When an affirmative determination is made in S811, the process illustrated in FIG. 20 is ended. When a negative determination is made in S811, the process proceeds to S812.

In S812, the vehicle collection/delivery determination portion 4022 determines whether or not the distance between the user terminal 200 of the collection/delivery user and the vehicle 10 is less than a predetermined threshold. When an affirmative determination is made in S812, the distance between the user terminal 200 of the collection/delivery user and the vehicle 10 is less than the predetermined threshold and the center server 400 is still waiting for reception of the collection/delivery completion notification. Accordingly, the process proceeds to S810 again. When a negative determination is made in S812, the distance between the user terminal 200 of the collection/delivery user and the vehicle 10 is the predetermined threshold or more, and thus, they are distanced from each other. Accordingly, the process proceeds to S806 again. Hereby, when the distance between the user terminal 200 of the collection/delivery user and the vehicle 10 becomes less than the predetermined threshold again (S806: YES), the approach notification is transmitted to the user terminal 200 of the collection/delivery user and the user terminal 50 of the client user (S809).

Note that the delivery-to-recipient control process illustrated in FIG. 20 is an example, and the delivery-to-recipient control process is not limited to this. For example, when it is detected in S812 that the user terminal 200 of the collection/delivery user and the vehicle 10 are distanced from each other by the predetermined threshold or more, the user terminal 200 of the collection/delivery user and the user terminal 50 of the client user may be notified that they are distanced from each other. Further, the delivery-to-recipient control process illustrated in FIG. 20 is not limited to being performed by the center server 400, and the collection/delivery management server 500 may perform the delivery-to-recipient control process, for example. The determination process in S802 or S806 is an example of a process of a "determination portion" "determining whether or not a distance between the first vehicle and the carrier is less than a first distance." Further, a notification transmission process in S805 or S809 is an example of a process of a "transmission portion" "transmitting, to the user terminal of the carrier, a notification indicating that the first vehicle and the user terminal of the carrier come closer to each other."

Figure 21:
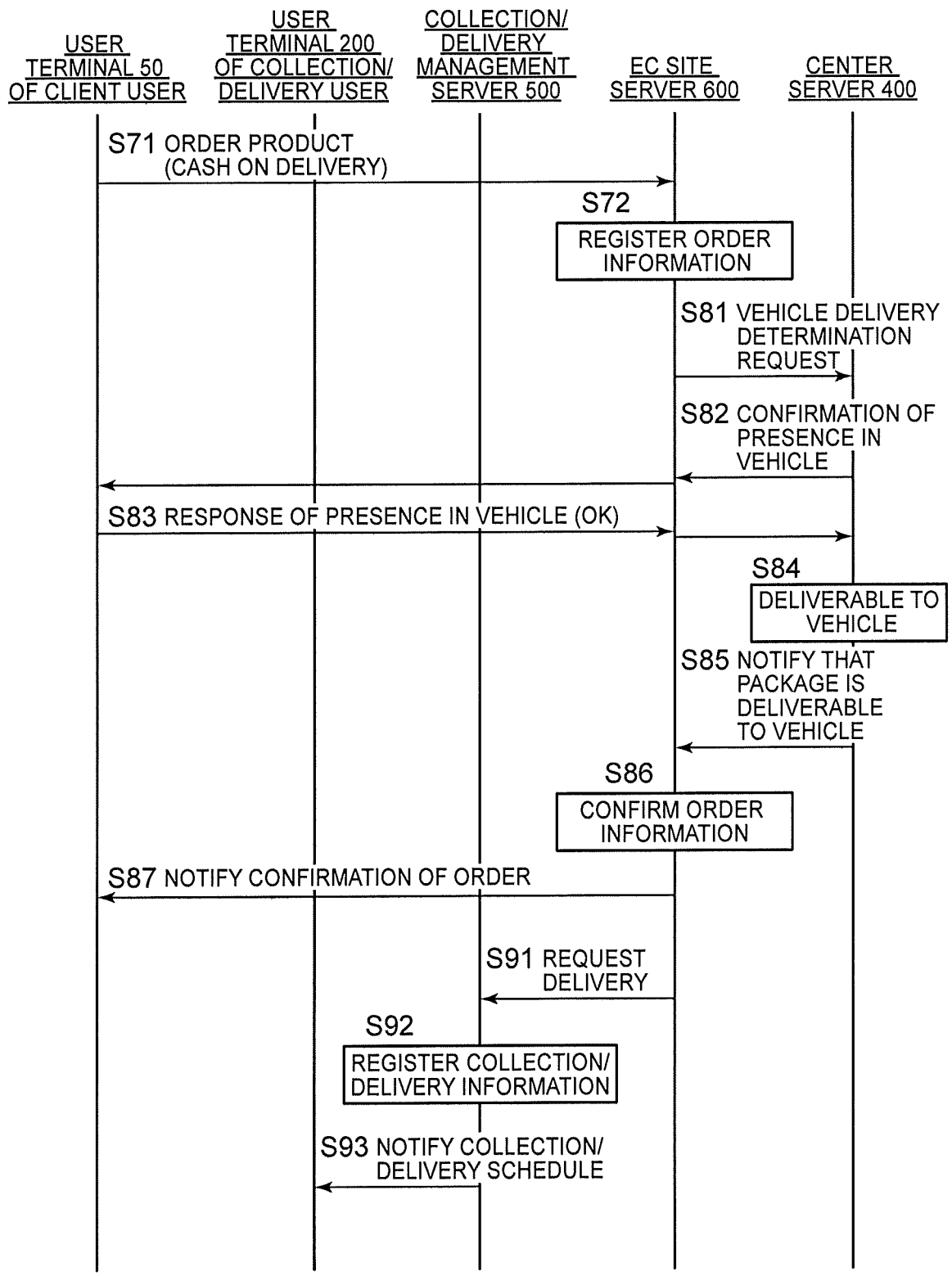
FIG. 21 is an example of a processing sequence in a concrete example.

FIG. 21 is an example of a processing sequence in a concrete example. With reference to FIG. 21, the following describes an example in which the vehicle collection/delivery determination process is performed when the client user orders a product on an EC site provided by the EC site server 600, the vehicle 10 is designated as a collection/delivery place for the product, and cash on delivery is designated as a payment method for the product, for example.

In S71, the client user orders a product from the user terminal 50. The client user selects the vehicle 10 as the collection/delivery place for the product and selects cash on delivery as the payment method, and the EC site server 600 receives the order of the product and is notified that the vehicle 10 is selected as the collection/delivery place and cash on delivery is selected as the payment method. In the example illustrated in FIG. 21, the client user designates a reception area and collection/delivery date and time. Further, the data communication device 350 is provided in the vehicle 10, and the center server 400 holds, in advance, information indicating that the data communication device 350 is provided in the vehicle 10.

In S72, the EC site server 600 receives the order of the product from the user terminal 50 of the client user, forms order information, and registers the order information in the order information table (FIG. 3). At this time, the EC site server 600 acquires attribute information of the ordered product and registers it in the order information table. In FIG. 21, since cash on delivery is designated as the payment method, information indicating that direct delivery to the recipient is required is included as one attribute information of the ordered product.

In S81, since the vehicle 10 is selected as the collection/delivery place for the product ordered from the client user, the EC site server 600 transmits a request of the vehicle collection/delivery determination to the center server 400. The order information of the ordered product is also transmitted to the center server 400 together with the request of the vehicle collection/delivery determination.

In S82, the center server 400 receives the request of the vehicle collection/delivery determination from the EC site server 600 (FIG. 8, S101: YES) and performs the vehicle collection/delivery determination process. In the example illustrated in FIG. 21, the package has, as attribute information, the information indicating that direct delivery to the recipient is required (FIG. 19, S701: YES), the vehicle 10 is provided with the data communication device 350 (FIG. 19, S702: YES), and the collection/delivery date and time and the reception area are designated by the client user (FIG. 19, S703: YES, S705: YES). Accordingly, the center server 400 transmits a notification for confirmation of the presence of the recipient inside the vehicle 10 in the reception area on the designated collection/delivery date and time, to the user terminal 50 of the client user via the EC site server 600 (FIG. 19, S707).

In S83, the client user inputs, into the user terminal 50, an OK response to the confirmation of the presence of the recipient inside the vehicle 10 in the reception area on the designated collection/delivery date and time, and the user terminal 50 transmits the OK response to the center server 400 via the EC site server 600.

In S84, since the center server 400 receives the OK response from the user terminal 50 of the client user (FIG. 19, S708: YES), it is determined that the package is deliverable to the vehicle (FIG. 19, S709). In S85, the center server 400 notifies the EC site server 600 that the vehicle 10 is usable as the collection/delivery place, as a determination result of the vehicle collection/delivery determination process (FIG. 8, S112).

In S86, the EC site server 600 confirms the order from the client user. In S87, the EC site server 600 notifies the user terminal 50 of the client user that the order is confirmed.

In S91, the EC site server 600 transmits a delivery request of the ordered product to the collection/delivery management server 500. The order information of the product is also transmitted to the collection/delivery management server 500 together with the delivery request.

In S92, upon receipt of the delivery request from the EC site server 600, the collection/delivery management server 500 generates collection/delivery information based on the order information of the product (package) received from the EC site server 600 and registers it in the collection/delivery management DB 503. In S93, the collection/delivery management server 500 notifies a collection/delivery schedule to the user terminal 200 of the collection/delivery user. The collection/delivery information of the package, the vehicle 10 as the collection/delivery place, the designated collection/delivery date and time, the designated reception area, and the like are notified to the user terminal 200 of the collection/delivery user together with the collection/delivery schedule.

Figure 22:
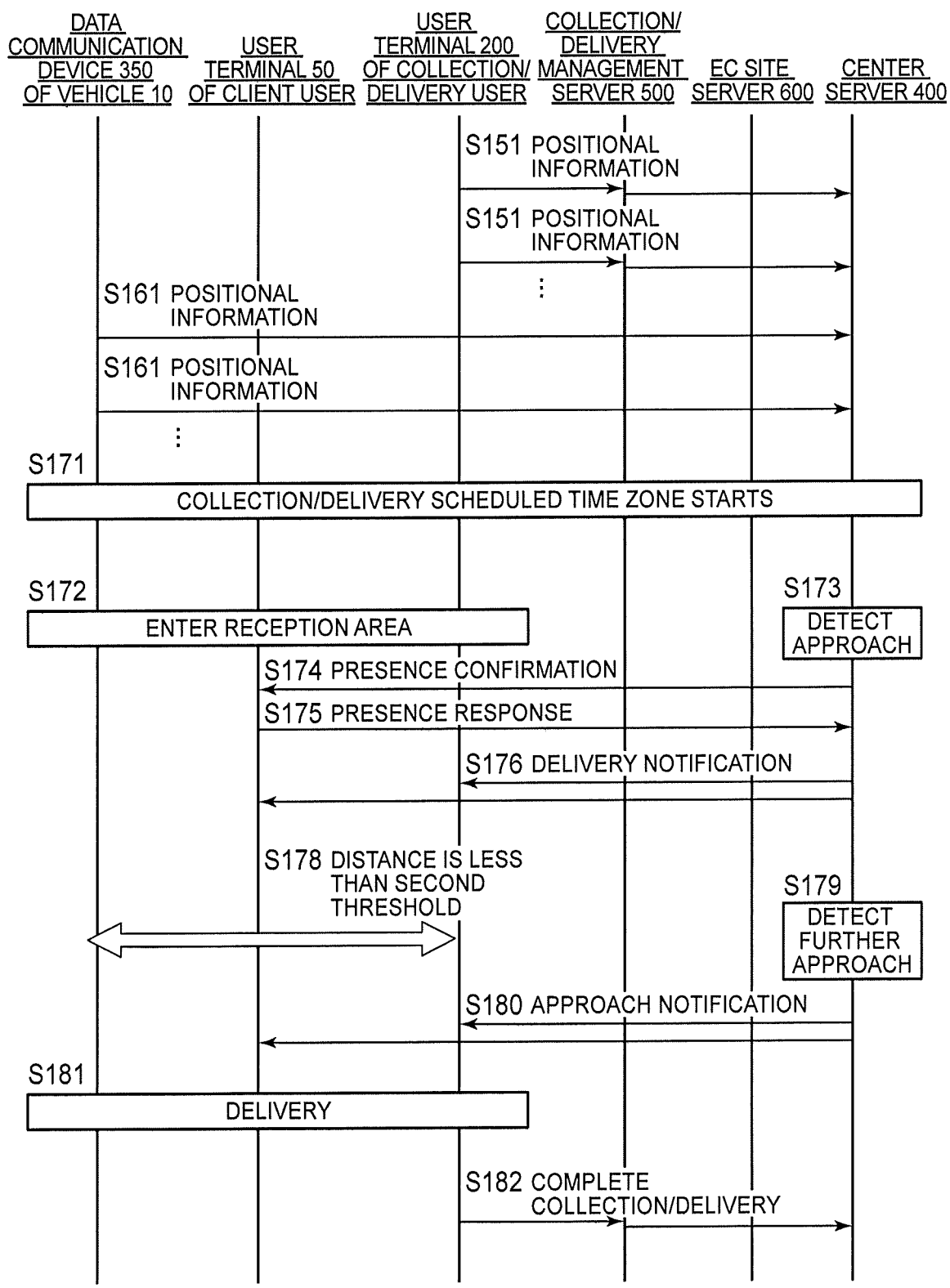
FIG. 22 is an example of a processing sequence in a concrete example.

FIG. 22 is an example of a processing sequence in a concrete example. With reference to FIG. 22, the following describes an example of delivering a package ordered by the client user with the vehicle 10 being designated as a collection/delivery place and cash on delivery being designated as a payment method. Note that, in FIG. 22, the recipient present inside the vehicle 10 is the client user.

In S151, the user terminal 200 of the collection/delivery user transmits positional information to the collection/delivery management server 500 at a predetermined cycle. When the collection/delivery management server 500 receives the positional information of the user terminal 200 of the collection/delivery user, the collection/delivery management server 500 transmits it to the center server 400. In S161, the data communication device 350 of the vehicle 10 transmits positional information to the center server 400 at a predetermined cycle. After that, the user terminal 200 of the collection/delivery user and the data communication device 350 of the vehicle 10 continuously transmit respective pieces of positional information, although not illustrated herein.

In S171, the collection/delivery scheduled time zone of the package is started (FIG. 20, S801: YES). In S172, the vehicle 10 and the collection/delivery user both move into the reception area. In S173, the center server 400 detects that the vehicle 10 and the user terminal 200 of the collection/delivery user are present within the reception area, from respective pieces of positional information of the vehicle 10 and the user terminal 200 of the collection/delivery user (FIG. 20, S802: YES).

In S174, the center server 400 transmits, to the user terminal 50 of the client user, an inquiry about whether the client user is present inside the vehicle 10. In S175, since the client user is present inside the vehicle 10, the client user inputs, into the user terminal 50, information indicative of the presence of the client user, and the user terminal 50 transmits, to the center server 400, a response indicating that the client user is present inside the vehicle 10 (FIG. 20, S803: YES).

In S176, the center server 400 transmits a delivery notification to the user terminal 50 of the client user and the user terminal 200 of the collection/delivery user (FIG. 20, S805). This can promote the client user (the recipient) and the collection/delivery user to prepare for reception of the package, for example, such that the client user parks the vehicle 10 at a parkable place in the neighborhood to wait for the collection/delivery user, while the collection/delivery user prepares delivery of the package to the vehicle 10. The parkable place is a place where the vehicle 10 can park (for example, a parking lot).

In S178, the vehicle 10 and the collection/delivery user both move, so that the distance therebetween becomes less than a predetermined threshold. In S179, the center server 400 detects that the distance between the vehicle 10 and the user terminal 200 of the collection/delivery user becomes less than the predetermined threshold and the client user and the collection/delivery user further come close to each other, from respective pieces of positional information of the vehicle 10 and the user terminal 200 of the collection/delivery user (FIG. 20, S806: YES).

In S180, the center server 400 transmits an approach notification to the user terminal 50 of the client user and the user terminal 200 of the collection/delivery user (FIG. 20, S809). This can help the client user (the recipient) and the collection/delivery user to meet each other such that the client user and the collection/delivery user search around for each other, for example.

In S181, the client user meets the collection/delivery user and receives the package. In S182, the collection/delivery user inputs collection/delivery completion into the user terminal 200, and the user terminal 200 transmits a collection/delivery completion notification to the center server 400 via the collection/delivery management server 500. The center server 400 receives the collection/delivery completion notification from the user terminal 200 of the collection/delivery user (FIG. 20, S810: YES), and ends the delivery-to-recipient control process for the package.

In the second embodiment, in the package attribute condition table, information indicating that direct delivery to the recipient is required is set to "DETERMINATION REQUIRED." Accordingly, when a predetermined condition is satisfied, a collection/delivery place for a package having, as attribute information, information indicating that direct delivery to the recipient is required can be set to the vehicle 10. The predetermined condition includes, for example, a condition that the vehicle 10 has positional information and a condition that the recipient is present inside the vehicle 10 in the collection/delivery scheduled time zone.

Further, in the second embodiment, by use of the positional information of the vehicle 10 and the positional information of the user terminal 200 of the collection/delivery user, the recipient can receive, in the vehicle 10 at a place of visit, the package having, as attribute information, information indicating that direct delivery to the recipient is required.

Further, in the second embodiment, a notification is performed in a case where it is detected that the vehicle 10 and the user terminal 200 of the collection/delivery user are present in the reception area and in a case where it is detected that the distance between the vehicle 10 and the user terminal 200 of the collection/delivery user is less than the predetermined threshold. This can support the recipient present inside the vehicle 10 to surely meet the collection/delivery user.

Note that, in the second embodiment, positional information acquired by the data communication device 350 provided in the vehicle 10 and transmitted to the center server 400 is used as the positional information of the vehicle 10, but the positional information is not limited to this. For example, positional information acquired by the user terminal of the client user or the recipient present in the vehicle 10 may be used as the positional information of the vehicle 10.

Others

In the first embodiment and the second embodiment, the center server 400 performs the vehicle collection/delivery determination process. Alternatively, the vehicle collection/delivery determination process may be performed by any of the collection/delivery management server 500, the EC site server 600, the user terminal 200 of the collection/delivery user, and the user terminal 50 of the client user. For example, the vehicle collection/delivery determination process can be achieved by holding information illustrated in FIGS. 4 to 7 and performing the process illustrated in FIG. 8. Note that the user terminal 50 of the client user can perform the vehicle collection/delivery determination process only in a case of a collection/delivery request made by the client user.

Further, in the first embodiment and the second embodiment, the vehicle collection/delivery determination process illustrated in FIG. 8 is performed based on the package attribute condition table illustrated in FIG. 6 or 18 (FIG. 8, S102, S103, and so on). The vehicle collection/delivery determination process is not limited to being performed based on a predetermined table such as the package attribute condition table. For example, the center server 400 may not hold the package attribute condition table. In the vehicle collection/delivery determination process, instead of the determination process in S103 in FIG. 8, for example, a determination process on whether or not a target package has each attribute information set to the package-undeliverable-to-vehicle field may be performed, and thus, the function of the package attribute condition table may be substituted by the determination process.

In the first embodiment and the second embodiment, it is determined whether or not the vehicle 10 is suitable as the collection/delivery place for the package, but a similar determination can be applied to a locker and the like which does not have a cooling function and which is easily affected by its surrounding environment.

Recording Medium

A program to cause a computer, other machines, and devices (hereinafter referred to as the computer and the like) to implement the issue control can be recorded in a recording medium readable by the computer and the like. By causing the computer and the like to read and execute the program in the recording medium, the computer functions as the center server 400.

Here, the recording medium readable by the computer and the like is a non-transitory recording medium in which information such as data or a program is stored electrically, magnetically, optically, mechanically, or chemically and from which the information can be read by the computer and the like. In such a recording medium, a recording medium that is removable from the computer and the like is, for example, a flexible disk, a magneto-optical disk, a CD-ROM, a CD-R/W, a DVD, a Blu-ray disk, a DAT, an 8-mm tape, a memory card such as a flash memory, and the like. Further, a recording medium fixed to the computer and the like includes a hard disk, a read-only memory (ROM), and the like. Further, a solid state drive (SSD) is also usable as a recording medium removable from the computer and the like or a recording medium fixed to the computer and the like.

What is claimed is:

1. An information processing system comprising:
communication circuitry configured to acquire, via a communication network, attribute information of a first package and surrounding environment condition information of a first vehicle; and
processing circuitry configured to:
perform, based on the attribute information and the surrounding environment condition information, a determination process of determining whether or not the first vehicle is suitable as a collection and delivery place for the first package based on package attribute condition information that is included in the attribute information of the first package, the package attribute condition information being related to an attribute of the first package as one of determination conditions based on which the first vehicle is determined to be suitable as the collection and delivery place, the surrounding environment condition information including at least date and time condition information indicative of date and time when the first vehicle is suitable or not suitable as the collection and delivery place, wherein
the communication circuitry is further configured to transmit a result of the determination process to an in-vehicle device located in the first vehicle, the result including authentication information to unlock the first vehicle in response to a determination that the first vehicle is suitable as the collection and delivery place, the authentication information including at least a key identifier for the in-vehicle device, the in-vehicle device unlocking the first vehicle in response to receipt of the result of the determination process,
wherein:
the package attribute condition information includes information indicating that direct delivery to a recipient is required, as attribute information of the first package for which the first vehicle is not suitable as the collection and delivery place,
when the attribute information of the first package includes the information indicating that direct delivery to the recipient is required, the processing circuitry is configured to determine that the first vehicle is not suitable as the collection and delivery place for the first package,
when the attribute information of the first package includes information indicating the product having a value that is greater than a predetermined value and the surrounding environment condition information of the first vehicle indicating an area where the first vehicle designated as the collection and delivery place for the first package is located is a caution area, the processing circuitry is configured to determine that the first vehicle is not suitable as the collection and delivery place for the first package, and the processing circuitry is configured to determine that the package attribute condition information includes the information indicating that direct delivery is required when the attribute information of the first package includes information on whether identification (ID) confirmation is required, information on whether freight collect is designated, or information on whether cash on delivery is designated.

2. The information processing system according to claim 1, wherein the processing circuitry is configured to perform the determination process further based on package deliverable schedule information of the first vehicle for a user who has a right to designate the first vehicle as the collection and delivery place.

3. The information processing system according to claim 1, wherein, when the attribute information of the first package includes information indicating that direct delivery to a recipient is required, the processing circuitry is configured to perform the determination process on the first vehicle designated as the collection and delivery place for the first package, based on a confirmation result about whether or not the recipient is present in the first vehicle on collection and delivery scheduled date and time.

4. The information processing system according to claim 3, wherein
the communication circuitry is configured to receive positional information of the first vehicle and positional information of a carrier for the first package, and
the processing circuitry is configured to, in response to a determination that the first vehicle is suitable as the collection and delivery place for the first package, determine whether or not a distance between the first vehicle and the carrier is less than a first distance, based on the positional information of the first vehicle and the positional information of the carrier, and
the communication circuitry is configured to, in response to a determination that the distance between the first vehicle and the carrier is less than the first distance, transmit, to at least a user terminal of the carrier, a notification indicating that the first vehicle and the carrier come close to each other.

5. The information processing system according to claim 1, wherein:
the package attribute condition information includes information indicative of a frozen product as the attribute information of the first package for which the first vehicle is not suitable as the collection and delivery place; and
when the attribute information of the first package includes the information indicative of the frozen product, the processing circuitry is configured to determine that the first vehicle is not suitable as the collection and delivery place for the first package.

6. The information processing system according to claim 1, wherein:
the package attribute condition information includes information indicative of a cold product, as attribute information for which the surrounding environment condition information is used in the determination process; and
when the attribute information of the first package includes the information indicative of the cold product, the processing circuitry is configured to perform the determination process based on the date and time condition information regarding information on date and time for delivery to the first vehicle.

7. The information processing system according to claim 1, wherein:
the package attribute condition information includes information indicative of a cold product, as attribute information for which the surrounding environment condition information is used in the determination process;
the surrounding environment condition information includes sunshine condition information indicative of a degree of sunlight under which the vehicle is suitable or not suitable as the collection and delivery place; and
when the attribute information of the first package includes the information indicative of the cold product, the processing circuitry is configured to perform the determination process based on the sunshine condition information regarding information indicative of the degree of sunlight on the first vehicle designated as the collection and delivery place for the first package.

8. The information processing system according to claim 1, wherein:
the surrounding environment condition information includes area condition information indicative of an area where the vehicle is suitable or not suitable as the collection and delivery place; and
the processing circuitry is configured to perform the determination process further by use of the area condition information, further based on an address of a location of the first vehicle designated as the collection and delivery place for the first package.

9. The information processing system according to claim 1, wherein:
the surrounding environment condition information includes parking position condition information indicative of a parking position at which the vehicle is suitable or not suitable as the collection and delivery place; and
the processing circuitry is configured to perform the determination process further by use of the parking position condition information, further based on information indicative of the parking position of the first vehicle designated as the collection and delivery place for the first package.

10. The information processing system according to claim 1, wherein
the processing circuitry is configured to, in response to a determination that the first vehicle designated as the collection and delivery place for the first package is suitable as the collection and delivery place, issue authentication information by which the first vehicle is configured be locked or unlocked, and
the processing circuitry is configured to control access of a carrier to a predetermined compartment in the first vehicle by issuing predetermined authentication information to a user terminal of the carrier, the predetermined compartment being a compartment in which the first package is placed, the predetermined compartment being configured to be locked or unlocked through a locking-unlocking process performed by a locking-unlocking control device, and the predetermined authentication information causing the locking-unlocking control device to perform the locking-unlocking process.

11. The information processing system according to claim 1, wherein the communication circuitry is configured to receive a determination request to determine whether or not the first vehicle is suitable as the collection and delivery place for the first package.

12. An information processing method comprising:
  acquiring attribute information of a first package surrounding environment information of a first vehicle;
  performing, based on the attribute information and the surrounding environment condition information, a determination process of determining whether or not the first vehicle is suitable as a collection and delivery place for the first package based on package attribute condition information that is included in the attribute information of the first package, the package attribute condition information being related to an attribute of the first package as one of determination conditions based on which the first vehicle is determined to be suitable as the collection and delivery place, the surrounding environment condition information including at least date and time condition information indicative of date and time when the first vehicle is suitable or not suitable as the collection and delivery place; and
  transmitting a result of the determination process to an in-vehicle device located in the first vehicle, the result including authentication information to unlock the first vehicle in response to a determination that the first vehicle is suitable as the collection and delivery place, the authentication information including at least a key identifier for the in-vehicle device, the in-vehicle device unlocking the first vehicle in response to receiving the result of the determination process,
  wherein:
  the package attribute condition information includes information indicating that direct delivery to a recipient is required, as attribute information of the first package for which the first vehicle is not suitable as the collection and delivery place,
  when the attribute information of the first package includes the information indicating that direct delivery to the recipient is required, the method further includes determining that the first vehicle is not suitable as the collection and delivery place for the first package,
  when the attribute information of the first package includes information indicating the product having a value that is greater than a predetermined value and the surrounding environment condition information of the first vehicle indicating an area where the first vehicle designated as the collection and delivery place for the first package is located is a caution area, the method further includes determining that the first vehicle is not suitable as the collection and delivery place for the first package, and
  the method further comprises determining that the package attribute condition information includes the information indicating that direct delivery is required when the attribute information of the first package includes information on whether identification (ID) confirmation is required, information on whether freight collect is designated, or information on whether cash on delivery is designated.

13. The information processing method according to claim 12, further comprising receiving a determination request to determine whether or not the first vehicle is suitable as the collection and delivery place for the first package.

14. A non-transitory storage medium in which a program is stored, wherein, when the program is executed by a computer, the computer executes the information processing method according to claim 12.

* * * * *